US012218351B2

(12) United States Patent
Ogawa et al.

(10) Patent No.: US 12,218,351 B2
(45) Date of Patent: *Feb. 4, 2025

(54) POSITIVE ELECTRODE ACTIVE MATERIAL FOR NONAQUEOUS ELECTROLYTE SECONDARY BATTERY

(71) Applicants: HONDA MOTOR CO., LTD., Tokyo (JP); NICHIA CORPORATION, Anan (JP)

(72) Inventors: Atsushi Ogawa, Wako (JP); Soshi Kawamura, Wako (JP); Toru Sukigara, Wako (JP); Hiroto Maeyama, Wako (JP); Kenichi Kobayashi, Tokushima (JP)

(73) Assignees: HONDA MOTOR CO., LTD., Tokyo (JP); NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,436

(22) Filed: Sep. 26, 2023

(65) Prior Publication Data

US 2024/0021816 A1 Jan. 18, 2024

Related U.S. Application Data

(63) Continuation of application No. 17/828,438, filed on May 31, 2022, now Pat. No. 11,804,600, which is a (Continued)

(30) Foreign Application Priority Data

Mar. 31, 2016 (JP) .................. 2016-072436
Mar. 24, 2017 (JP) .................. 2017-059661

(51) Int. Cl.
H01M 4/525 (2010.01)
C01G 53/00 (2006.01)
(Continued)

(52) U.S. Cl.
CPC ............ *H01M 4/525* (2013.01); *C01G 53/42* (2013.01); *C01G 53/50* (2013.01); *H01M 4/366* (2013.01);
(Continued)

(58) Field of Classification Search
CPC ...... H01M 4/525; H01M 4/366; H01M 4/505; H01M 2004/028; H01M 2220/20;
(Continued)

(56) References Cited

U.S. PATENT DOCUMENTS 10,622,629 B2 * 4/2020 Ogawa .................. H01M 4/366
11,380,892 B2 * 7/2022 Ogawa .................. H01M 4/525
(Continued)

FOREIGN PATENT DOCUMENTS

EP    0.806 397 A1    11/1997
EP    2 058 281 A2    5/2009
(Continued)

OTHER PUBLICATIONS

Third Party Submission under 37 CFR 1.290 filed in U.S. Appl. No. 16/808,525 on May 26, 2021.

*Primary Examiner* — Stewart A Fraser
(74) *Attorney, Agent, or Firm* — Birch, Stewart, Kolasch & Birch, LLP

(57) ABSTRACT

A positive electrode active material for a nonaqueous electrolyte secondary battery includes particles of a lithium-transition metal composite oxide that contains nickel in the composition thereof and has a layered structure. The particles have an average particle size $D_{SEM}$ based on electron microscopic observation in a range of 1 μm to 7 μm in which a ratio $D_{50}/D_{SEM}$ of a 50% particle size $D_{50}$ in volume-based cumulative particle size distribution to the average particle size based on electron microscopic observation is in a range of 1 to 4, and a ratio $D_{90}/D_{10}$ of a 90% particle size $D_{90}$ to (Continued)

2.50 μm a 10% particle size $D_{10}$ in volume-based cumulative particle size distribution is 4 or less.

20 Claims, 8 Drawing Sheets

Related U.S. Application Data continuation of application No. 16/808,525, filed on Mar. 4, 2020, now Pat. No. 11,380,892, which is a continuation of application No. 15/474,735, filed on Mar. 30, 2017, now Pat. No. 10,622,629.

(51) Int. Cl.
*H01M 4/36* (2006.01)
*H01M 4/505* (2010.01)
*H01M 4/02* (2006.01)

(52) U.S. Cl.
CPC ......... *H01M 4/505* (2013.01); *C01P 2002/20* (2013.01); *C01P 2002/50* (2013.01); *C01P 2002/52* (2013.01); *C01P 2004/03* (2013.01); *C01P 2004/51* (2013.01); *C01P 2004/61* (2013.01); *C01P 2006/40* (2013.01); *H01M 2004/021* (2013.01); *H01M 2004/028* (2013.01); *H01M 2220/20* (2013.01)

(58) Field of Classification Search
CPC ...... H01M 4/131; H01M 4/364; C01G 53/42; C01G 53/50
See application file for complete search history.

(56) References Cited

U.S. PATENT DOCUMENTS

| | | | |
|---|---|---|---|
| 11,804,600 B2* | 10/2023 | Ogawa | H01M 4/505 |
| 2004/0110063 A1 | 6/2004 | Uchitomi et al. | |
| 2012/0270107 A1 | 10/2012 | Toya et al. | |
| 2014/0134491 A1 | 5/2014 | Sugimoto et al. | |
| 2014/0308584 A1 | 10/2014 | Endo | |
| 2016/0006030 A1 | 1/2016 | Saka et al. | |
| 2016/0056462 A1 | 2/2016 | Sakai et al. | |
| 2016/0254536 A1 | 9/2016 | Hiratsuka | |
| 2017/0012288 A1 | 1/2017 | Yamaji et al. | |
| 2017/0187031 A1 | 6/2017 | Kurita et al. | |

FOREIGN PATENT DOCUMENTS

| | | | |
|---|---|---|---|
| EP | 2 824 735 A2 | 1/2015 | |
| EP | 3151316 A1 | 4/2017 | |
| JP | 2001-243949 A | 9/2001 | |
| JP | 2003-123748 A | 4/2003 | |
| JP | 2003-221236 A | 8/2003 | |
| JP | 2003-288899 A | 10/2003 | |
| JP | 2004-355824 A | 12/2004 | |
| JP | 2008-147068 A | 6/2008 | |
| JP | 2010-47466 A | 3/2010 | |
| JP | 2013-201077 A | 10/2013 | |
| JP | 214-63669 A | 4/2014 | |
| JP | 2015-56382 A | 3/2015 | |
| JP | 2016-164869 A | 9/2016 | |
| WO | WO 2012/176471 A1 | 12/2012 | |
| WO | WO 2013/069454 A1 | 5/2013 | |
| WO | WO 2014/115754 A1 | 7/2014 | |
| WO | WO 2014/175191 A1 | 10/2014 | |
| WO | WO 2015/115547 A1 | 8/2015 | |
| WO | WO 2015/182665 A1 | 12/2015 | |

* cited by examiner 2.50μm 2.50μm 2.50μm 2.50μm 2.56 μm 2.50 μm 2.50μm 2.50μm 2.50μm 2.50μm 2.50μm 2.50μm 2.50μm 2.50μm 2.50μm

POSITIVE ELECTRODE ACTIVE MATERIAL FOR NONAQUEOUS ELECTROLYTE SECONDARY BATTERY

CROSS-REFERENCE TO RELATED APPLICATIONS

This application is a Continuation of U.S. application Ser. No. 17/828,438 filed on May 31, 2022, which is a Continuation of U.S. application Ser. No. 16/808,525 filed on Mar. 4, 2020 (now U.S. Pat. No. 11,380,892 B2 issued Jul. 5, 2022), which is a Continuation of U.S. application Ser. No. 15/474,735 filed on Mar. 30, 2017 (now U.S. Pat. No. 10,622,629 B2 issued Apr. 14, 2020), which claims priority to Japanese Patent Application No. 2016-072436, filed on Mar. 31, 2016, and Japanese Patent Application No. 2017-059661, filed on Mar. 24, 2017. All of the above applications are hereby expressly incorporated by reference into the present application.

BACKGROUND

Field of the Invention

The present disclosure relates to a positive electrode active material for a nonaqueous electrolyte secondary battery.

Description of Related Art

A positive electrode active material for a nonaqueous electrolyte secondary battery for application to large-sized power machines, such as electric vehicles, is required to have high output characteristics and high durability. In order to obtain high output characteristics, in a positive electrode active material having a structure in which a large number of primary particles are aggregated to form secondary particles, it is effective, for example, to have a hollow structure in each secondary particle to increase the BET specific surface area, and to reduce the size of aggregated primary particles of each secondary particle. However, in such a positive electrode active material, one or more cracks may occur in the secondary particles due to pressurization in the formation of an electrode, expansion/shrinkage upon charge and discharge, etc., and there has been room for improvement in durability.

In relation to the above, a positive electrode active material in which the number of primary particles forming one secondary particle is reduced has been proposed (see, e.g., JP 2001-243949 A). In addition, a positive electrode active material in which primary particles are monodispersed has been proposed (see, e.g., JP 2004-355824 A).

SUMMARY

A positive electrode active material for a nonaqueous electrolyte secondary battery includes particles of a lithium-transition metal composite oxide that contains nickel in the composition thereof and has a layered structure. The particles have an average particle size $D_{SEM}$ based on electron microscopic observation in a range of 1 μm to 7 μm, in which ratio $D_{50}/D_{SEM}$ of a 50% particle size $D_{50}$ in volume-based cumulative particle size distribution to the average particle size based on electron microscopic observation is in a range of 1 to 4, and a ratio $D_{90}/D_{10}$ of a 90% particle size $D_{90}$ to a 10% particle size $D_{10}$ in volume-based cumulative particle size distribution is 4 or less.

DETAILED DESCRIPTION

Figure 1:
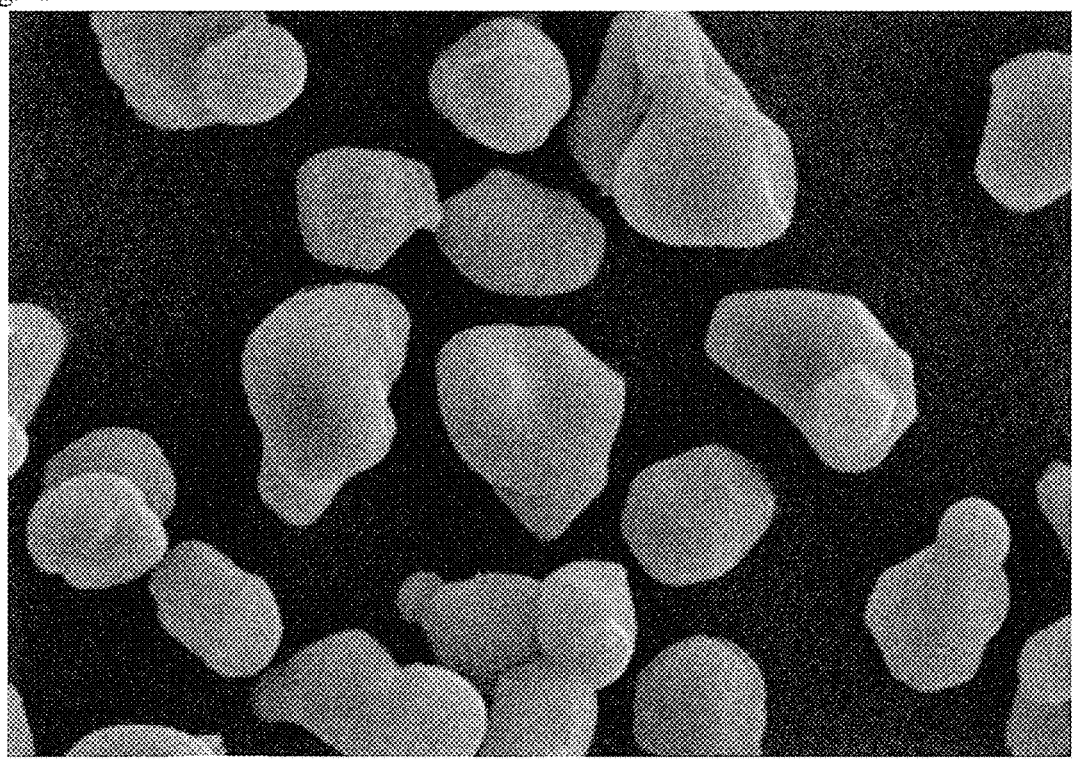
FIG. 1 shows an example of an SEM image of lithium-transition metal composite oxide particles in Example 1.

The present invention resides in a positive electrode active material for a nonaqueous electrolyte secondary battery with both high output characteristics and high durability.

The invention is described in detail as follows, and includes the aspects shown below.

A first aspect is a positive electrode active material for a nonaqueous electrolyte secondary battery, including particles of a lithium-transition metal composite oxide that contains nickel in the composition thereof and has a layered structure, the particles having an average particle size $D_{SEM}$ based on electron microscopic observation in a range of 1 μm to 7 μm, in which a ratio $D_{50}/D_{SEM}$ of the 50% particle size $D_{50}$ in volume-based cumulative particle size distribution to the average particle size $D_{SEM}$ is in a range of 1 to 4 based on electron microscopic observation, and the ratio $D_{90}/D_{10}$ of the 90% particle size $D_{90}$ to the 10% particle size $D_{10}$ in volume-based cumulative particle size distribution is 4 or less.

A second aspect is an electrode for a nonaqueous electrolyte secondary battery, including a current collector and a positive electrode active material layer that is disposed on the current collector and contains the positive electrode active material described above.

A third aspect is a nonaqueous electrolyte secondary battery including the electrode described above.

According to one embodiment of the present disclosure, a positive electrode active material for a nonaqueous electrolyte secondary battery can be provided in which both high output power characteristics and high durability can be achieved.

A positive electrode active material for a nonaqueous electrolyte secondary battery according the present disclosure will be described in the description below based on embodiments. However, the following embodiments are intended to embody the technical concept of the present invention, and the scope of the present invention is not limited thereto. In the present specification, the content of each component in a composition refers to, in the case where a plurality of substances corresponding to such a component are present in the composition, the total amount of the plurality of substances present in the composition unless otherwise specified.

Positive Electrode Active Material for Nonaqueous Electrolyte Secondary Battery

A positive electrode active material for a nonaqueous electrolyte secondary battery according to one embodiment of the present disclosure (hereinafter sometimes simply referred to as "positive electrode active material") includes particles of a lithium-transition metal composite oxide containing nickel in the composition thereof and having a layered structure. The particles have the average particle size $D_{SEM}$ based on electron microscopic observation in a range of 1 μm to 7 μm, in which the ratio $D_{50}/D_{SEM}$ of the 50% particle size $D_{50}$ in volume-based cumulative particle size distribution to the average particle size based on electron microscopic observation is in a range of 1 to 4, and the ratio $D_{90}/D_{10}$ of the 90% particle size $D_{90}$ to the 10% particle size $D_{10}$ in volume-based cumulative particle size distribution is 4 or less.

The positive electrode active material contains lithium-transition metal composite oxide particles (hereinafter sometimes simply referred to as "composite oxide particles") having the average particle size $D_{SEM}$ based on electron microscopic observation in a range of 1 μm to 7 μm, the value of $D_{50}/D_{SEM}$ in a range of 1 to 4, and the value of $D_{90}/D_{10}$ of 4 or less. The value of $D_{50}/D_{SEM}$ in a range of 1 to 4 indicates that the composite oxide particles are composed of a single primary particle or a small number of primary particles (hereinafter both may simply referred to as "a single particle"), having reduced contact grain boundaries between primary particles. In addition, the value of $D_{90}/D_{10}$ of 4 or less indicates that the composite oxide particles have a narrow distribution width in volume-based cumulative particle size distribution, and the particle size is substantially uniform. With these features, high output characteristics and high durability can be both achieved.

As compared with a positive electrode active material containing lithium-transition metal composite oxide particles having secondary particles made of a large number of aggregated primary particles, in a conventional positive electrode active material containing lithium-transition metal composite oxide particles, which are single particles, a decrease in capacity retention ratio due to the disconnection of the electrical conduction path of lithium ions caused by the grain boundary dissociation of secondary particles during a charge/discharge cycle is prevented, and also an increase in the diffusion/migration resistance of lithium ions is prevented. Accordingly, good durability is exhibited. Meanwhile, in such a conventional positive electrode active material, a three-dimensional grain boundary network as in a positive electrode active material made of aggregated particles is hardly formed, and a high-power design utilizing grain boundary conduction is difficult to achieve. Therefore, there has been a tendency that the output characteristics are insufficient. It is believed that output power characteristics can be increased by decreasing the particle size ($D_{SEM}$) of single particles. However, in the case where the particle size is too small, the interaction between particles is increased, so that the electrode plate filling properties tend to be greatly deteriorated. Further, a decrease in powder fluidity may result in the handling ability being greatly deteriorated. Meanwhile, in particular, for obtaining a practical energy density, a certain degree of the particle size is needed. However, it is believed that an increase in particle size tends to result in a greater lack of output power.

The lithium-transition metal composite oxide particles according to one embodiment of the present disclosure have more uniform particle size than that of conventional single particles. With this configuration, even in the case where the battery is charged and discharged at a high current density, variations in charge/discharge depth among particles due to current concentration on some particles can be reduced. Accordingly, it is believed that, while preventing increase in resistance due to current concentration, local degradation through charge/discharge cycles can be reduced.

Further, with uniform particle size of lithium-transition metal composite oxide particles having reduced grain boundaries, the particles do not collapse even when pressed at a high pressure in the manufacturing of an electrode. Accordingly, the space between particles is considered to be homogenized. In addition, in the case where a battery is formed, the space between particles is filled with an electrolyte to serve as a lithium ion diffusion path. With uniform size of such a diffusion path, variations in amount of charge/discharge among particles can be reduced. Accordingly, it is considered that, even lithium-transition metal composite oxide particles having reduced contact grain boundaries between primary particles can achieve good output power characteristics while ensuring electrode plate filling performance.

Further, generally, in the case where single particles are synthesized, heat treatment is needed to be performed under high temperature for growth of particles. In particular, in a composition having a high Ni proportion, when calcination is performed at a high temperature, the element Ni may be incorporated into the Li site, that is, so-called disorder may occur. Disorder inhibits the diffusion of Li ions in composite oxide particles and causes resistance, resulting in effects such as a decrease in charge/discharge capacity at a practical current density, a decrease in output characteristics, etc. Therefore, it is preferable that such disorder be suppressed. Suppressing disorder allows for further improving the capacity and output power characteristics in single particles.

In the composite oxide particles forming the positive electrode active material, the average particle size $D_{SEM}$ based on electron microscopic observation is in a range of 1 μm to 7 μm in view of durability. The average particle size $D_{SEM}$ based on electron microscopic observation is determined as follows. Using a scanning electron microscope (SEM), observation is performed at a magnification of 1,000 to 10,000 in accordance with the particle size. One hundred particles having recognizable profiles are selected, and the equivalent spherical diameters of the selected particles are calculated using an image processing software. The arithmetic average of the obtained equivalent spherical diameters is determined as $D_{SEM}$.

In the composite oxide particles, the ratio $D_{50}/D_{SEM}$ of the 50% particle size $D_{50}$ in volume-based cumulative particle size distribution to the average particle size $D_{SEM}$ based on electron microscopic observation is in a range of 1 to 4. In the case where $D_{50}/D_{SEM}$ is 1, the composite oxide particles are single particles. In the case where $D_{50}/D_{SEM}$ is closer to 1, the composite oxide particles are made of small number of primary particles. In view of durability, it is preferable that $D_{50}/D_{SEM}$ be in a range of 1 to 4. In view of power output density, it is preferable that $D_{50}/D_{SEM}$ be 3 or less, particularly preferably 2.5 or less.

Further, the 50% particle size $D_{50}$ of the composite oxide particles is in a range of 1 µm to 21 µm, for example. In view of power output density, it is preferable that $D_{50}$ be 1.5 µm or more, more preferably 3 µm or more, and be 8 µm or less, more preferably 5.5 µm or less.

The 50% particle size $D_{50}$ is determined as a particle size corresponding to a cumulative percentage of 50% from the smaller particle size side in the volume-based cumulative particle size distribution measured under wet conditions using a laser diffraction particle size distribution analyzer. Similarly, the 90% particle size $D_{90}$ and 10% particle size $D_{10}$ described below are determined as particle sizes corresponding to cumulative percentages of 90% and 10%, respectively, from the smaller particle size side.

In the composite oxide particles, the ratio of 90% particle size $D_{90}$ to 10% particle size $D_{10}$ in volume-based cumulative particle size distribution indicates the width of particle size distribution. The smaller the value is, the more uniform the particle size. $D_{90}/D_{10}$ is 4 or less. In view of power density, it is preferable that $D_{90}/D_{10}$ is 3 or less, more preferably 2.5 or less. The lower limit of $D_{90}/D_{10}$ is 1.2 or more, for example.

The lithium-transition metal composite oxide contains nickel in the composition thereof and has a layered structure. Examples of such lithium-transition metal composite oxides include lithium-nickel composite oxides and lithium-nickel-cobalt-manganese composite oxides. Among them, a lithium-transition metal composite oxide preferably has a composition represented by the following formula (1).

$$Li_pNi_xCo_yM^1_zO_{2+\alpha} \qquad (1)$$

In formula (1), p, x, y, z, and α satisfy 1.0≤p≤1.3, 0.3≤x≤0.95, 0≤y≤0.4, 0≤z≤0.5, x+y+z=1, and −0.1≤α≤0.1, and $M^1$ represents at least one of Mn and Al.

The lithium-transition metal composite oxide particles may be doped with an element other than the elements forming the lithium-transition metal composite oxide. Examples of an element for doping include B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi. Examples of compounds used for doping with these elements include oxides and fluorides containing at least one element selected from the group consisting of these elements, and Li composite oxides thereof. The amount of doping may be, for example, 0.005 mol % or more and 10 mol % or less with respect to the lithium-transition metal composite oxide particles, for example.

The lithium-transition metal composite oxide particles may include core particles containing a lithium-transition metal composite oxide and a deposit disposed on the core particle surface. The deposit should be disposed on at least a portion of the core particle surface, and is preferably disposed in a region of 1% or more of the surface area of the core particles. The composition of the deposit is suitably selected in accordance with the purpose and the like, and examples thereof include oxides and fluorides containing at least one kind selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, as well as Li-composite oxides thereof. The content of deposit may be, for example, in a range of 0.03 mass % to 10 mass %, preferably 0.1 mass % to 2 mass %, of the lithium-transition metal composite oxide particles.

The composition of lithium-transition metal composite oxide contains nickel. In the lithium-transition metal composite oxide, in view of the initial efficiency in a nonaqueous electrolyte secondary battery, the disorder of nickel element determined by X-ray diffractometry is preferably 4.0% or less, more preferably 2.0% or less, and still more preferably 1.5% or less. The expression "disorder of nickel element" refers to chemical disorder of nickel ions generated in a site of transition metal ions. In a lithium-transition metal composite oxide having a layered structure, such a disorder is typically an exchange between lithium ions that occupies the site represented by 3b when expressed in the Wyckoff symbol (i.e., 3b site, the same applies hereinafter) and transition metal ions that occupies the 3a site. The smaller disorder of nickel element is, the more initial efficiency is improved, and thus is more preferable.

The disorder of elemental nickel in a lithium-transition metal composite oxide can be determined by X-ray diffractometry. The X-ray diffraction spectrum of a lithium-transition metal composite oxide is measured using a CuKα ray. The composition model is represented by $Li_{1-d}Ni_dMeO_2$ (wherein Me is transition metals other than nickel in the lithium-transition metal composite oxide), and structural optimization is performed by Rietveld analysis based on the obtained X-ray diffraction spectrum. The percentage of d calculated as a result of structural optimization is determined as the value of elemental nickel disorder.

In the case where the lithium-transition metal composite oxide has a composition represented by formula (1), in one embodiment of the present invention, the range of p, the ranges of particle sizes represented by $D_{SEM}$, $D_{50}$, $D_{90}$, and $D_{10}$, and the preferred range of the disorder of elemental nickel may vary in accordance with the value of x in formula (1). Examples thereof will be shown hereinafter.

In formula (1), in the case where x is within a range of 0.3≤x<0.6, in view of power density and electrode plate filling properties, it is preferable that $D_{SEM}$ be 1.1 µm or more, more preferably 1.3 µm or more, and be 4 µm or less, more preferably 2 µm or less. In the case where x is within a range of 0.6≤x≤0.95, in view of power density and electrode plate filling properties, it is preferable that $D_{SEM}$ be 1.1 µm or more, more preferably 1.3 µm or more, and be 5 µm or less, more preferably 4 µm or less.

In formula (1), in the case where x satisfies 0.3≤x<0.8, in view of power density, it is preferable that $D_{50}/D_{SEM}$ is in a range of 1 to 2.

In formula (1), in the case where x satisfies 0.3≤x<0.6, in view of power density, it is preferable that at least one of the conditions shown below be satisfied.
  (i) In view of charge/discharge capacity, it is preferable that the disorder of elemental nickel in the lithium-transition metal composite oxide particles determined by X-ray diffractometry be 1.5% or less.
  (ii) It is preferable that $D_{90}/D_{10}$ be 3.0 or less, more preferably 2.5 or less.
  (iii) In view of electrode plate filling properties, it is preferable that $D_{50}$ be in a range of 1 µm to 5.5 µm, more preferably in a range of 1 µm to 3 µm.
  (iv) It is preferable that p in formula (1) satisfy 1.1<p<1.2.

In formula (1), in the case where x satisfies $0.6 \leq x < 0.8$, in view of output power density, it is preferable that at least one of the conditions shown below be satisfied.
  (i) In view of charge/discharge capacity, it is preferable that the disorder of elemental nickel in the lithium-transition metal composite oxide particles determined by X-ray diffractometry be 2.0% or less.
  (ii) It is preferable that $D_{90}/D_{10}$ be 2.3 or less.
  (iii) In view of electrode plate filling properties, it is preferable that $D_{50}$ be in a range of 1 μm to 5.5 μm.

In formula (1), in the case where x satisfies $0.8 \leq x < 0.95$, in view of power density, it is preferable that at least one of the conditions shown below be satisfied.
  (i) In view of charge/discharge capacity, it is preferable that the disorder of elemental nickel in the lithium-transition metal composite oxide particles determined by X-ray diffractometry be 4.0% or less.
  (ii) It is preferable that $D_{90}/D_{10}$ be 3.0 or less.
  (iii) In view of electrode plate filling properties, it is preferable that $D_{50}$ is in a range of 1 μm to 5.5 μm.

Method for Producing Positive Electrode Active Material

Lithium-transition metal composite oxide particles contained in the positive electrode active material according to the present disclosure can be produced by a method including: mixing a lithium compound and an oxide having a desired composition to obtain a raw material mixture; and subjecting the obtained raw material mixture to a heat treatment. The heat-treated product resulting from the heat treatment may be subjected to a crushing treatment, and may further be subjected to a treatment for removing unreacted substances, by-products, and the like by washing with water, etc. The product may further be subjected to a dispersion treatment, a classification treatment, and the like.

Examples of methods of obtaining an oxide having a desired composition include: a method in which raw material compounds (hydroxide, carbonate, etc.) are mixed according to the intended composition and decomposed into an oxide by a heat treatment; a coprecipitation method in which a raw material compound soluble in a solvent is dissolved in a solvent, then control of the temperature, adjustment of the pH, or adding of a complexing agent, for example, is performed to obtain a precipitate of a precursor in accordance with the intended composition, and the precursors are subjected to a heat treatment to obtain an oxide; and the like.

An example of a method of producing a positive electrode active material will be described in the case where the lithium-transition metal composite oxide is represented by formula (1) shown below.

It is preferable that the method of obtaining a raw material mixture includes: providing a composite oxide containing nickel, cobalt, and at least one of manganese and aluminum by a coprecipitation method; and mixing the obtained composite oxide with a lithium compound such as lithium carbonate or lithium hydroxide.

The method of obtaining a composite oxide by a coprecipitation method can include: a seed formation step of adjusting the pH and the like of a mixed aqueous solution containing metal ions in a desired composition to obtain seed crystals; a crystallization step of growing the formed seed crystals to obtain a composite hydroxide having desired characteristics; and a step of subjecting the obtained composite hydroxide to a heat treatment to obtain a composite oxide. The details of the method of obtaining a composite oxide may be referred to in JP 2003-292322 A, JP 2011-116580 A, and the like (the disclosures of which are incorporated herein by reference in their entirety).

The composite oxide obtained by a coprecipitation method has a value of $D_{90}/D_{10}$, which serves as an index of particle size distribution, of 3 or less, for example, preferably 2 or less. In addition, $D_{50}$ is 12 μm or less, for example, preferably 6 μm or less, and more preferably 4 μm or less, and is 1 μm or more, for example, preferably 2 μm or more.

The content ratio Ni/Co/(Mn+Al) of nickel, cobalt, and manganese+aluminum in the composite oxide may be 1/1/1, 6/2/2, or 8/1/1, for example.

It is preferable that the raw material mixture contains a lithium compound in addition to the composite oxide. Examples of lithium compounds include lithium carbonate, lithium hydroxide, and lithium oxide. The particle size of the lithium compound used is, as $D_{50}$, in a range of 0.1 μm to 100 μm, for example, preferably in a range of 2 μm to 20 μm. The content of lithium with respect to the raw material mixture may be, as Li/(Ni+Co+Mn+Al), 1.0 or more and 1.3 or less, for example, preferably 1.2 or less. The composite oxide and the lithium compound may be mixed, for example, using a high-speed shear mixer or the like, for example.

The obtained raw material mixture is subjected to a heat treatment, which allows for obtaining lithium-transition metal composite oxide particles. The heat treatment is performed under a temperature in a range of 700° C. to 1,100° C., for example. The heat treatment may be performed at a single temperature, or may also be performed at a plurality of temperatures. In the case where the heat treatment is performed at a plurality of temperatures, for example, it is possible to perform a first heat treatment at a temperature in a range of 700° C. to 925° C., and then perform a second heat treatment at a temperature in a range of 930° C. to 1,100° C. Further, a third heat treatment may be additionally performed at a temperature in a range of 700° C. to 850° C.

The time of the heat treatment is in a range of 1 to 40 hours, for example. In the case where the heat treatment is performed at a plurality of temperatures, each treatment may be performed for in a range of 1 to 10 hours. The heat treatment may be performed in the air or an oxygen atmosphere.

The heat-treated product may be subjected to a crushing treatment, a dispersion treatment, a classification treatment, and the like. As a result, desired lithium-transition metal composite oxide particles can be obtained.

In addition, after being subjected to a crushing treatment, a dispersion treatment, a classification treatment, or the like, the heat-treated product may be further mixed with a lithium compound to obtain a mixture, followed by an additional heat treatment. In the case where a lithium compound is further mixed, the content of lithium in the mixture may be, for example, represented as Li/(Ni+Co+Mn+Al), and may be in a range of 1.05 to 1.3, preferably 1.1 to 1.2. In addition, the additional heat treatment may be performed at a temperature in a range of 850° C. to 1,000° C., preferably in a range of 870° C. to 950° C. It is preferable that the temperature be lower than the temperature of the heat treatment of the raw material mixture. The heat treatment time of the additional heat treatment may be, for example in a range of 2 hours to 15 hours. After the additional heat treatment, a crushing treatment, a dispersion treatment, a classification treatment, or the like may be performed.

Electrode for Nonaqueous Electrolyte Secondary Battery

An electrode for a nonaqueous electrolyte secondary battery includes a current collector and a positive electrode active material layer that is disposed on the current collector and contains the positive electrode active material for a nonaqueous electrolyte secondary battery described above. A nonaqueous electrolyte secondary battery including such an electrode can achieve both high durability and high output characteristics.

Examples of materials for the current collector include aluminum, nickel, and stainless steel. The positive electrode active material layer can be formed as below. A positive electrode mixture obtained by mixing the above positive electrode active material, an electrically conductive material, a binder, and the like with a solvent is applied onto a current collector, followed by a drying treatment, a pressurization treatment, and the like. Examples of electrically conductive materials include natural graphite, artificial graphite, and acetylene black. Examples of binders include polyvinylidene fluoride, polytetrafluoroethylene, and polyamide acrylic resin.

Nonaqueous Electrolyte Secondary Battery

A nonaqueous electrolyte secondary battery includes the electrode for a nonaqueous electrolyte secondary battery described above. In addition to the electrode for a nonaqueous electrolyte secondary battery, the nonaqueous electrolyte secondary battery further includes a negative electrode for a nonaqueous secondary battery, a nonaqueous electrolyte, a separator, and the like. As the negative electrode, nonaqueous electrolyte, separator, and the like in the nonaqueous electrolyte secondary battery, those for a nonaqueous electrolyte secondary battery described in JP 2002-075367 A, JP 2011-146390 A, JP 2006-12433 A, and the like (the disclosures of which are incorporated herein by reference in their entirety) may be suitably used, for example.

EXAMPLES

Examples of the present invention will be described below in detail.

First, methods of measuring physical properties in examples and comparative examples in the below will be described.

The value of $D_{10}$, $D_{50}$, and $D_{90}$ were determined by, with use of a laser diffraction particle size distribution analyzer (SALD-3100 manufactured by Shimadzu Corporation), measuring volume-based cumulative particle size distribution, and calculating the value of each of $D_{10}$, $D_{50}$, and $D_{90}$ corresponding to the respective cumulative percentages from the smaller particle size side were determined.

The average particle size $D_{SEM}$ based on electron microscopic observation was determined as follows. In an image observed at a magnification of 1,000 to 10,000 using a scanning electron microscope (SEM), 100 particles having recognizable outlines were selected, and the equivalent spherical diameters of the selected particles were calculated using an image processing software (Image J).

The arithmetic average of the obtained equivalent spherical diameters was determined as $D_{SEM}$.

The value of elemental nickel disorder (amount of Ni disorder) was determined by X-ray diffractometry as below.

The X-ray diffraction spectrum of obtained lithium-transition metal composite oxide particles was measured using a CuKα ray under conditions of a tube current of 40 mA and a tube voltage of 40 kV. With the composition model being expressed as $Li_{1-d}Ni_dMeO_2$ (wherein Me is transition metals other than nickel in the lithium-transition metal composite oxide), based on the obtained X-ray diffraction spectrum, the structure of the lithium-transition metal composite oxide particles was optimized by Rietveld analysis using RIETAN-2000 software. The percentage of d calculated as a result of structural optimization was determined as the amount of Ni disorder.

Example 1

Seed Formation Step

First, 10 kg of water was charged in a reaction tank, an aqueous ammonia solution was added into water while stirring water, and the ammonium ion concentration was adjusted to 1.8 mass %. The temperature in the tank was set at 25° C., and a nitrogen gas was circulated in the tank to maintain the oxygen concentration of the inner space of the reaction tank at 10 vol % or less. A 25 mass % aqueous sodium hydroxide solution was added to water in the reaction tank, and the pH value of the solution in the tank was adjusted to 13.5 or more.

Next, a nickel sulfate solution, a cobalt sulfate solution, and a manganese sulfate solution were mixed to prepare a mixed aqueous solution having a molar ratio of 1:1:1.

The mixed aqueous solution was added to the solution in the reaction tank until the solute content reached 4 mol, and, while controlling the pH value of the reaction solution at 12.0 or more with a sodium hydroxide solution, seed formation was performed.

Crystallization Step

After the seed formation step, the temperature in the tank was maintained at 25° C. or more until the completion of the crystallization step. In addition, a mixed aqueous solution having a solute content of 1,200 mol was prepared and added to the reaction tank simultaneously with an aqueous ammonia solution while maintaining the ammonium ion concentration in the solution at 2,000 ppm or more over 5 hours or more so that no additional seed formation would take place in the reaction tank. During the reaction, the pH value of the reaction solution was controlled to be maintained in a range of 10.5 to 12.0 with a sodium hydroxide solution. Sampling was successively performed during the reaction, and the addition was completed when the $D_{50}$ of the composite hydroxide particles reached about 4.5 μm.

Next, the product was washed with water, filtered, and dried, so that composite hydroxide particles are obtained. The obtained hydroxide precursor was subjected to a heat treatment at 300° C. for 20 hours in the ambient atmosphere, thereby obtaining a composite oxide having the following properties: composition ratio Ni/Co/Mn=0.33/0.33/0.33, $D_{10}$=3.4 μm, $D_{50}$=4.5 μm, $D_{90}$=6.0 μm, $D_{90}/D_{10}$=1.8.

Synthesis Step

The obtained composite oxide and lithium carbonate were mixed so that Li/(Ni+Co+Mn) becomes 1.15 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 10 minutes, and then dry-sieved to obtain a powder. The obtained powder was classified through a dry classifier into three sizes (large, medium, and small), and medium-sized particles were collected. The proportion of medium-sized particles after classification relative to before classification was 46 wt %.

As a result, lithium-transition metal composite oxide particles represented by the composition formula: $Li_{1.15}Ni_{0.33}Co_{0.33}Mn_{0.33}O_2$ and having the following properties were obtained: average particle size $D_{SEM}$ based on electron microscopic observation: 3.6 μm, $D_{10}$=3.7 μm, $D_{50}$=5.1 μm, $D_{90}$=6.7 μm, ratio $D_{50}/D_{SEM}$ of $D_{50}$ to average particle size $D_{SEM}$: 1.4, ratio $D_{90}/D_{10}$ in particle size distribution: 1.8, amount of Ni disorder: 0.3%. The physical property values of the obtained lithium-transition metal composite oxide particles are shown in Table 1, and an SEM image thereof is shown in FIG. 1.

Example 2

Under the same conditions as in Example 1 except that the timing of the completion of addition of a mixed aqueous solution in the crystallization step was changed to the time where the value of $D_{50}$ of composite hydroxide particles reached about 3.0 µm, a composite oxide having the following properties was obtained: composition ratio Ni/Co/Mn=0.33/0.33/0.33, $D_{10}$=2.2 µm, $D_{50}$=3.0 µm, $D_{90}$=4.1 µm, $D_{90}/D_{10}$=1.9. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 30 minutes, and then dry-sieved to obtain a powder. The obtained powder and lithium carbonate were mixed so that Li/(Ni+Co+Mn) becomes 1.17 and calcined in air at 700° C. for 10 hours to obtain a sintered body. The obtained sintered body was crushed, subjected to a dispersion treatment in a ball mill made of resin for 30 minutes, and then dry-sieved to obtain powder.

As a result, lithium-transition metal composite oxide particles represented by the composition formula: $Li_{1.17}Ni_{0.33}Co_{0.33}Mn_{0.33}O_2$ and having the following properties were obtained: average particle size $D_{SEM}$: 1.2 µm, $D_{10}$=1.4 µm, $D_{50}$=3.2 µm, $D_{90}$=5.1 µm, ratio $D_{50}/D_{SEM}$ of $D_{50}$ to average particle size $D_{SEM}$: 2.7, ratio $D_{90}/D_{10}$ in particle size distribution: 3.6, amount of Ni disorder: 1.7%. The physical property values of the obtained lithium-transition metal composite oxide particles are shown in Table 1.

Example 3

A composite oxide was obtained under the same conditions as in Example 2. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 30 minutes, and then dry-sieved to provide powder. The obtained powder and lithium carbonate were mixed so that Li/(Ni+Co+Mn) becomes 1.17 and calcined in air at 900° C. for 10 hours to obtain a sintered body. The obtained sintered body was crushed, subjected to a dispersion treatment in a ball mill made of resin for 30 minutes, and then dry-sieved to give a powder.

Figure 2:
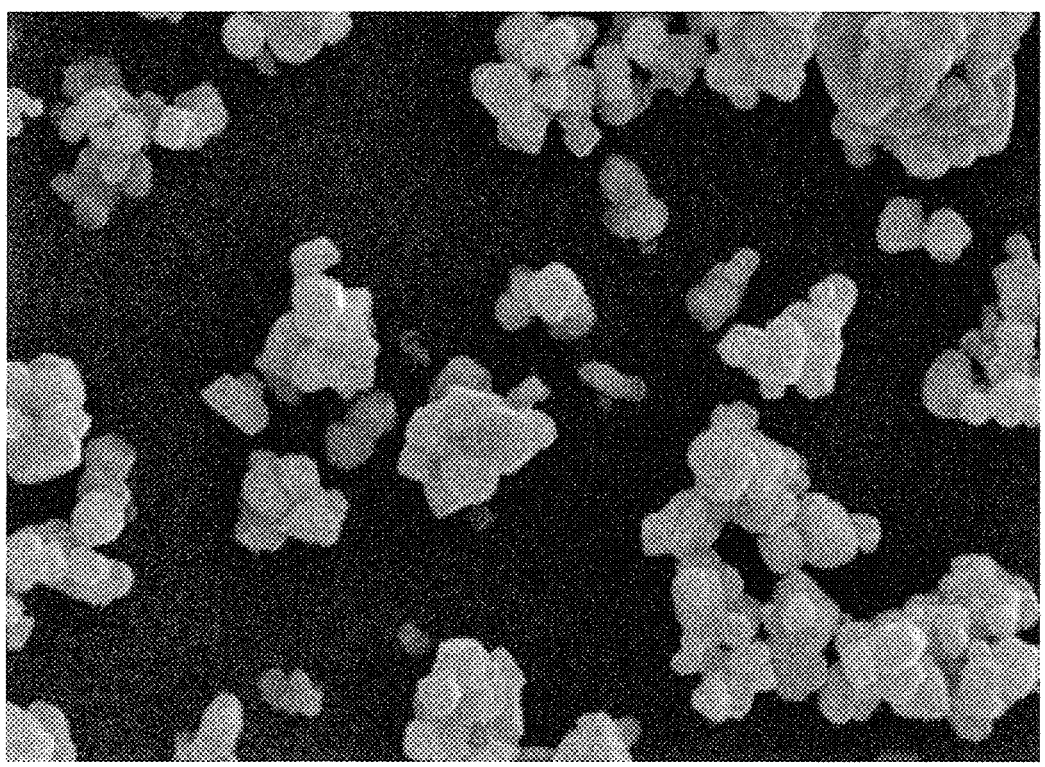
FIG. 2 shows an example of an SEM image of lithium-transition metal composite oxide particles in Example 3.

As a result, lithium-transition metal composite oxide particles represented by the composition formula: $Li_{1.17}Ni_{0.33}Co_{0.33}Mn_{0.33}O_2$ and having the following properties were obtained: average particle size $D_{SEM}$: 1.2 µm, $D_{10}$=1.5 µm, $D_{50}$=3.3 µm, $D_{90}$=5.1 µm, ratio $D_{50}/D_{SEM}$ of $D_{50}$ to average particle size $D_{SEM}$: 2.8, ratio $D_{90}/D_{10}$ in particle size distribution: 3.4, amount of Ni disorder: 0.9%. The physical property values of the obtained lithium-transition metal composite oxide particles are shown in Table 1, and an SEM image thereof is shown in FIG. 2.

Example 4

A composite oxide was obtained under the same conditions as in Example 2. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 30 minutes, and then dry-sieved to obtain a powder. The obtained powder and lithium carbonate were mixed so that Li/(Ni+Co+Mn) becomes 1.17 and calcined in air at 900° C. for 10 hours to give a sintered body. The obtained sintered body was crushed, subjected to a dispersion treatment twice using a jet mill with the feed pressure adjusted to 0.4 MPa and the grinding pressure adjusted to 0.55 MPa so as to prevent the primary particles from being ground, and then dry-sieved to give a powder.

Figure 3:
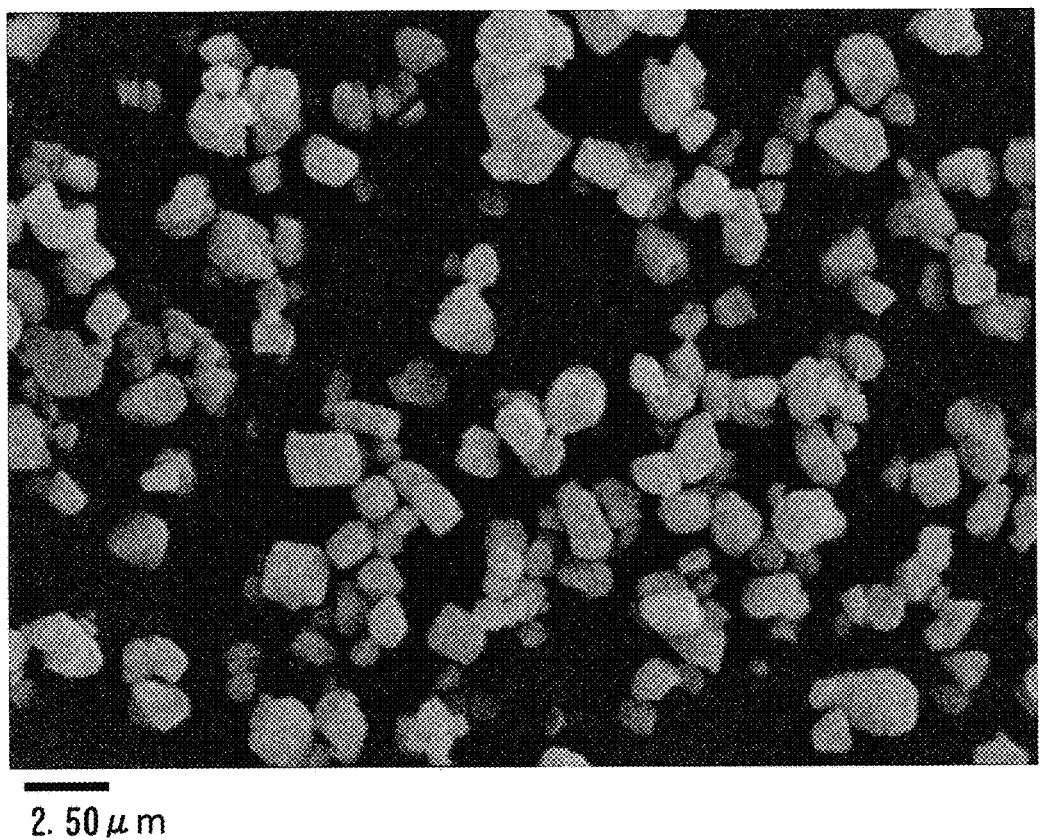
FIG. 3 shows an example of an SEM image of lithium-transition metal composite oxide particles in Example 4.

As a result, lithium-transition metal composite oxide particles represented by the composition formula: $Li_{1.17}Ni_{0.33}Co_{0.33}Mn_{0.33}O_2$ and having the following properties were obtained: average particle size $D_{SEM}$: 1.4 µm, $D_{10}$=1.1 µm, $D_{50}$=1.9 µm, $D_{90}$=2.8 µm, ratio $D_{50}/D_{SEM}$ of $D_{50}$ to average particle size $D_{SEM}$: 1.4, ratio $D_{90}/D_{10}$ in particle size distribution: 2.5, amount of Ni disorder: 1.0%. The physical property values of the obtained lithium-transition metal composite oxide particles are shown in Table 1, and an SEM image thereof is shown in FIG. 3.

Example 5

Under the same conditions as in Example 1 except that the timing of the completion of addition of a mixed aqueous solution in the crystallization step was changed to the time where the $D_{50}$ of composite hydroxide particles reached 9.9 µm, a composite oxide having the following properties was obtained: composition ratio Ni/Co/Mn=0.33/0.33/0.33, $D_{10}$=8.6 µm, $D_{50}$=9.9 µm, $D_{90}$=12.7 µm, $D_{90}/D_{10}$=1.5. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,080° C. for 6 hours to obtain a sintered body. The obtained sintered body was crushed, subjected to a dispersion treatment in a ball mill made of resin for 10 minutes, and then dry-sieved to obtain a powder. The obtained powder and lithium carbonate were mixed so that Li/(Ni+Co+Mn) becomes 1.14 and calcined in air at 900° C. for 10 hours to obtain sintered body. The obtained sintered body was crushed, subjected to a dispersion treatment in a ball mill made of resin for 10 minutes, and then dry-sieved to obtain powder.

Figure 4:
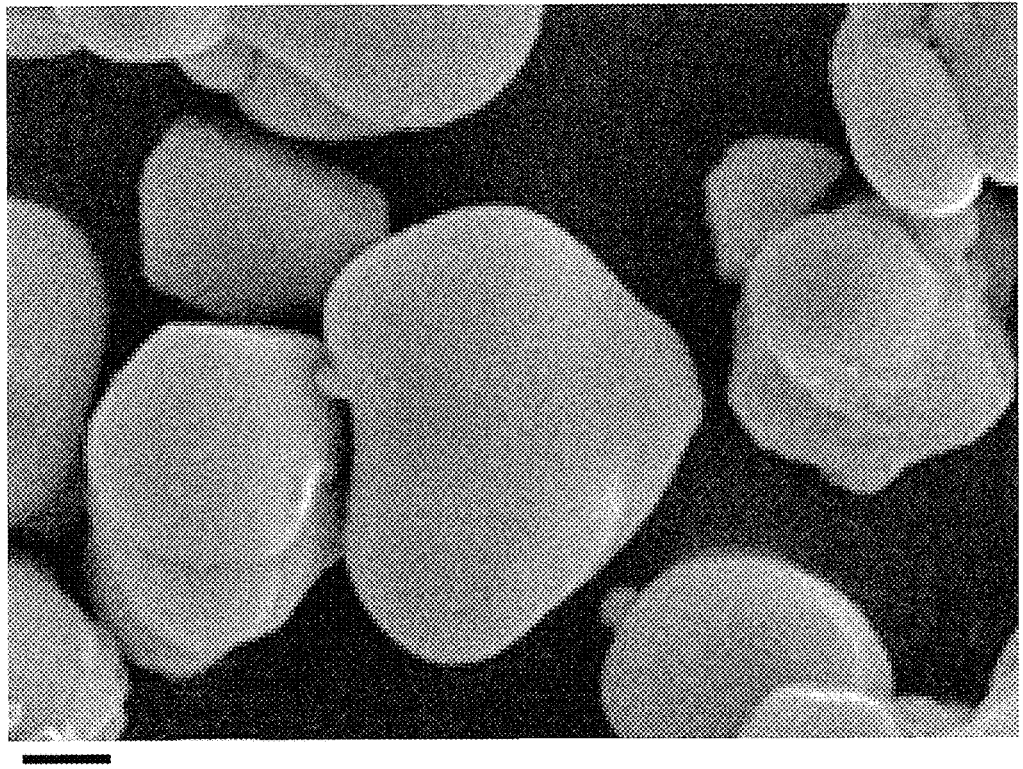
FIG. 4 shows an example of an SEM image of lithium-transition metal composite oxide particles in Example 5.

As a result, lithium-transition metal composite oxide particles represented by the composition formula: $Li_{1.14}Ni_{0.33}Co_{0.33}Mn_{0.33}O_2$ and having the following properties were obtained: average particle size $D_{SEM}$: 6.8 µm, $D_{10}$=7.6 µm, $D_{50}$=10.4 µm, $D_{90}$=16.4 µm, ratio $D_{50}/D_{SEM}$ of $D_{50}$ to average particle size $D_{SEM}$: 1.5, ratio $D_{90}/D_{10}$ in particle size distribution: 2.2, amount of Ni disorder: 1.1%. The physical property values of the obtained lithium-transition metal composite oxide particles are shown in Table 1, and an SEM image thereof is shown in FIG. 4.

Example 6

A composite oxide was obtained under the same conditions as in Example 2. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 10 minutes, and then dry-sieved to obtain a powder. The obtained powder and lithium carbonate were mixed so that Li/(Ni+Co+Mn) becomes 1.14 and calcined in air at 900° C. for 10 hours to obtain a sintered body. The obtained sintered body was crushed, subjected to a dispersion treatment in a ball mill made of resin for 10 minutes, and then dry-sieved to obtain a powder.

Figure 5:
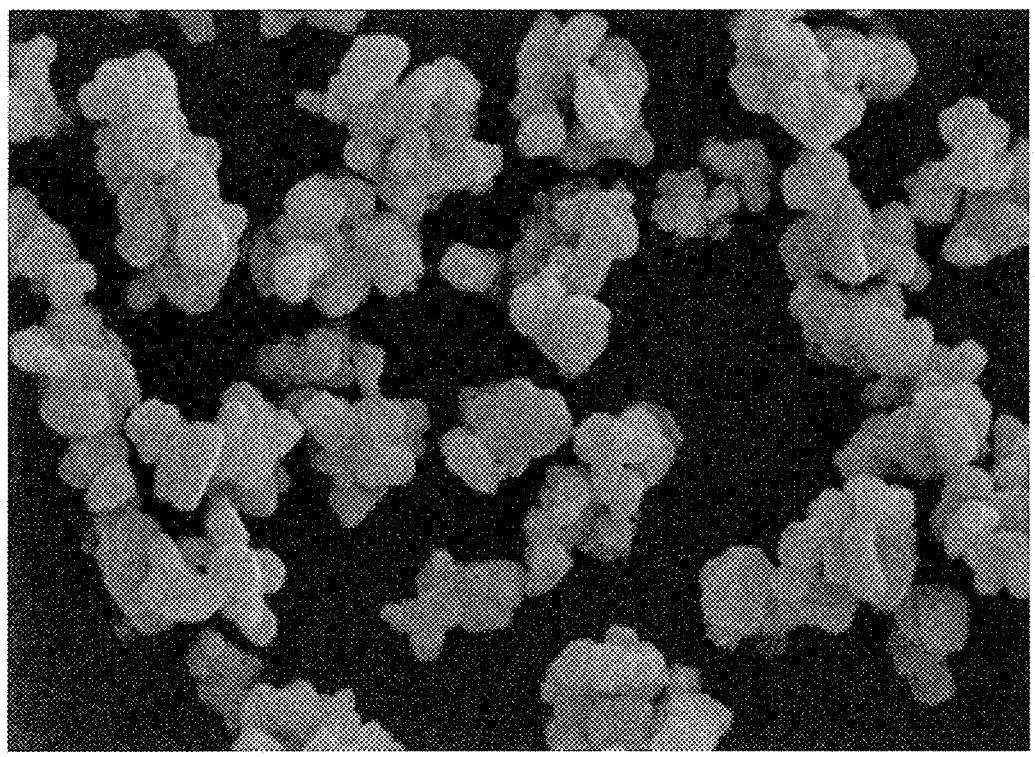
FIG. 5 shows an example of an SEM image of lithium-transition metal composite oxide particles in Example 6.

As a result, lithium-transition metal composite oxide particles represented by the composition formula: $Li_{1.14}Ni_{0.33}Co_{0.33}Mn_{0.33}O_2$ and having the following properties were obtained: average particle size $D_{SEM}$: 1.25 µm, $D_{10}$=2.7 µm, $D_{50}$=4.5 µm, $D_{90}$=6.7 µm, ratio $D_{50}/D_{SEM}$ of $D_{50}$ to average particle size $D_{SEM}$ of primary particles: 3.6, ratio $D_{90}/D_{10}$ in particle size distribution: 2.5, amount of Ni disorder: 1.0%. The physical property values of the obtained lithium-transition metal composite oxide particles are shown in Table 1, and an SEM image thereof is shown in FIG. 5.

Comparative Example 1

Under the same conditions as in Example 1 except that, during the reaction in the crystallization step, a seed slurry prepared in the seed formation step to the reaction tank was added several times, and the timing of the completion of addition of a mixed aqueous solution was changed to the time at which the $D_{50}$ of composite hydroxide particles reached 5.0 µm, a composite oxide having the following properties was obtained: composition ratio Ni/Co/Mn=0.33/0.33/0.33, $D_{10}$=2.4 µm, $D_{50}$=5.0 µm, $D_{90}$=12.2 µm, $D_{90}/D_{10}$=5.1. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 10 minutes, and then dry-sieved to obtain powder. The obtained powder and lithium carbonate were mixed so that Li/(Ni+Co+Mn) becomes 1.14 and calcined in air at 900° C. for 10 hours to obtain a sintered body. The obtained sintered body was crushed, subjected to a dispersion treatment in a ball mill made of resin for 10 minutes, and then dry-sieved to obtain powder.

Figure 6:
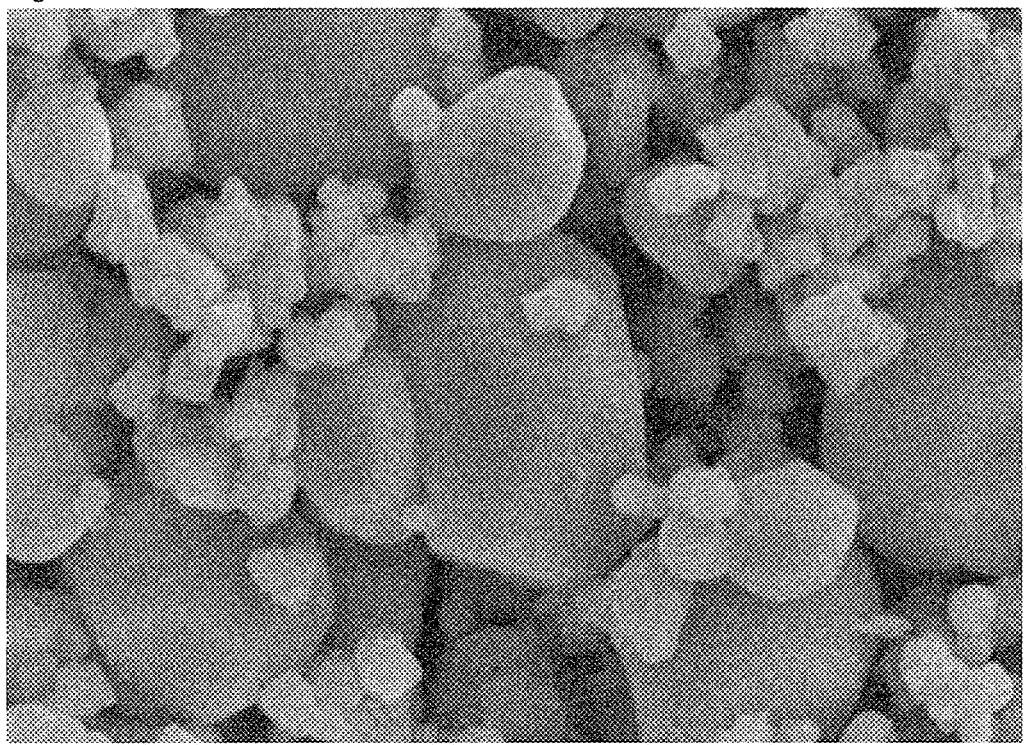
FIG. 6 shows an example of an SEM image of lithium-transition metal composite oxide particles in Comparative Example 1.

As a result, lithium-transition metal composite oxide particles represented by the composition formula: $Li_{1.14}Ni_{0.33}Co_{0.33}Mn_{0.33}O_2$ and having the following properties were obtained: average particle size $D_{SEM}$: 3.65 µm, $D_{10}$=2.5 µm, $D_{50}$=7.0 µm, $D_{90}$=13.5 µm, ratio $D_{50}/D_{SEM}$ of $D_{50}$ to average particle size of primary particles: 1.9, ratio $D_{90}/D_{10}$ in particle size distribution: 5.4, amount of Ni disorder: 0.9%. The physical property values of the obtained lithium-transition metal composite oxide particles are shown in Table 1, and an SEM image thereof is shown in FIG. 6.

Comparative Example 2

A composite oxide was obtained under the same conditions as in Example 2. The obtained composite oxide and lithium carbonate were mixed so that Li/(Ni+Co+Mn) becomes 1.15 to obtain a raw material mixture. The obtained raw material mixture was calcined in air at 950° C. for 15 hours to obtain a sintered body. The obtained sintered body was crushed, subjected to a dispersion treatment in a ball mill made of resin for 10 minutes, and then dry-sieved to obtain a powder.

Figure 7:
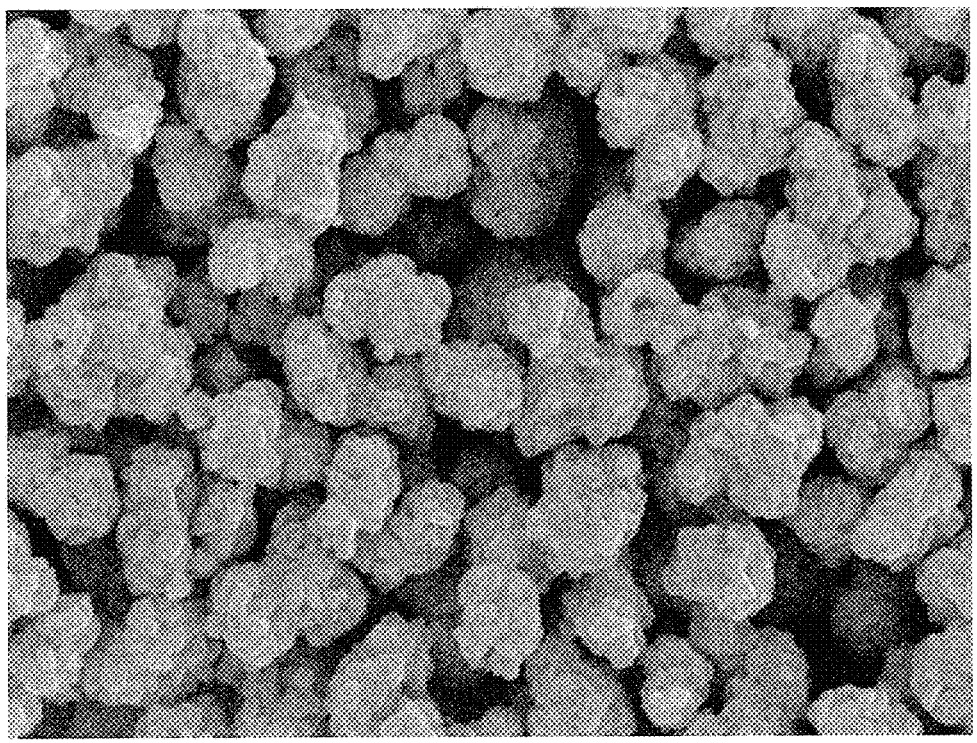
FIG. 7 shows an example of an SEM image of lithium-transition metal composite oxide particles in Comparative Example 2.

As a result, lithium-transition metal composite oxide particles represented by the composition formula: $Li_{1.15}Ni_{0.33}Co_{0.33}Mn_{0.33}O_2$ and having the following properties were obtained: average particle size $D_{SEM}$: 0.49 µm, $D_{10}$=3.0 µm, $D_{50}$=4.4 µm, $D_{90}$=7.6 µm, $D_{50}/D_{SEM}$, a ratio of $D_{50}$ to average particle size $D_{SEM}$: 9.0, $D_{90}/D_{10}$ in particle size distribution: 2.5, amount of Ni disorder: 0.9%. The physical property values of the obtained lithium-transition metal composite oxide particles are shown in Table 1, and an SEM image thereof is shown in FIG. 7.

Example 7

Under the same conditions as in Example 1, except that the molar ratio of the nickel sulfate solution, cobalt sulfate solution, and manganese sulfate solution in the mixed aqueous solution were changed to 6:2:2, and that the timing of the completion of addition of the mixed aqueous solution in the crystallization step was changed to the time at which the $D_{50}$ of the composite hydroxide particles reached 4.7 µm, a composite oxide having the following properties was obtained: composition ratio Ni/Co/Mn=0.60/0.20/0.20, $D_{10}$=4.0 µm, $D_{50}$=4.7 µm, $D_{90}$=6.2 µm, $D_{90}/D_{10}$=1.6. The obtained composite oxide and lithium hydroxide monohydrate were mixed so that Li/(Ni+Co+Mn) becomes 1.06 to obtain a raw material mixture. The obtained raw material mixture was calcined in an oxygen stream at 870° C. for 7 hours and then calcined at 970° C. for 7 hours to obtain a sintered body. The obtained sintered body was crushed and subjected to a dispersion treatment in a ball mill made of resin for 10 minutes to obtain a powder. Further, the powder and 10 mass % of water with respect to the powder were added to a high-speed stirring mixer equipped with a rotating blade. The mixture was stirred at 2,000 rpm to elute the residual alkali from the grain boundaries and perform a dispersion treatment, dried at 350° C., and then dry-sieved to obtain a powder.

Figure 8:
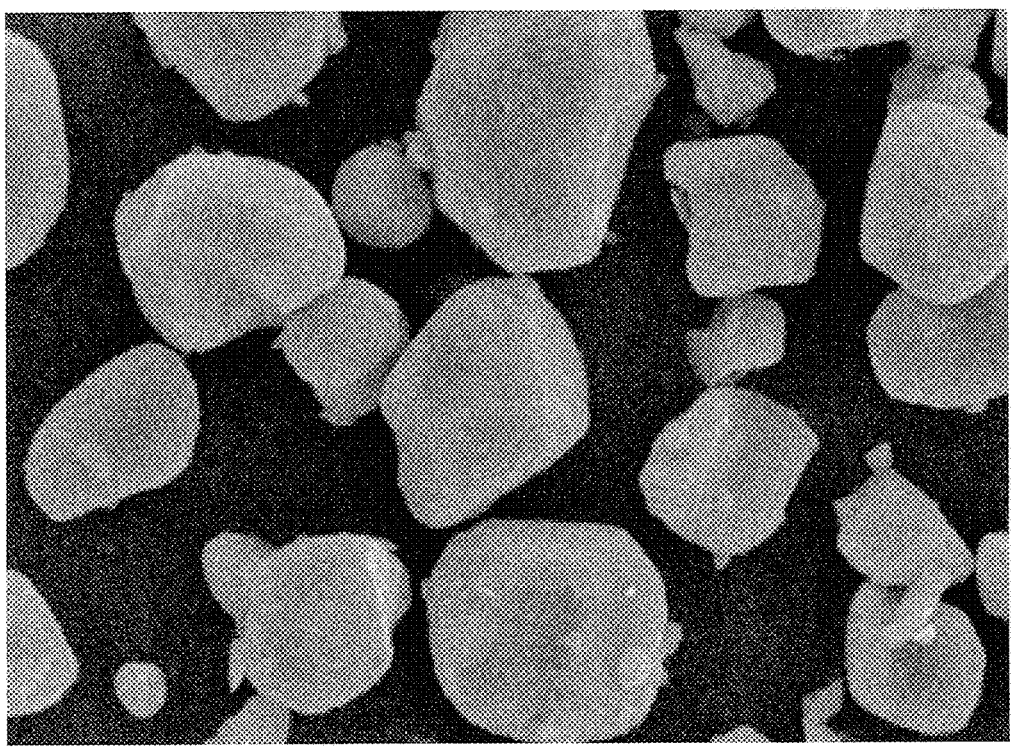
FIG. 8 shows an example of an SEM image of lithium-transition metal composite oxide particles in Example 7.

As a result, lithium-transition metal composite oxide particles represented by the composition formula: $Li_{1.06}Ni_{0.60}Co_{0.20}Mn_{0.20}O_2$ and having the following properties were obtained: average particle size $D_{SEM}$: 3.7 µm, $D_{10}$=3.4 µm, $D_{50}$=5.4 µm, $D_{90}$=7.7 µm, ratio $D_{50}/D_{SEM}$ of $D_{50}$ to average particle size $D_{SEM}$: 1.5, ratio $D_{90}/D_{10}$ in particle size distribution: 2.3, amount of Ni disorder: 1.5%. The physical property values of the obtained lithium-transition metal composite oxide particles are shown in Table 1, and an SEM image thereof is shown in FIG. 8.

Example 8

A composite oxide was obtained under the same conditions as in Example 7. The obtained composite oxide and lithium hydroxide monohydrate were mixed so that Li/(Ni+Co+Mn) becomes 1.17 to obtain a raw material mixture. The obtained raw material mixture was calcined in air at 930° C. for 10 hours to obtain a sintered body. The obtained sintered body was crushed and subjected to a dispersion treatment in a ball mill made of resin for 10 minutes to obtain a powder. Further, the powder and 10 mass % of water relative to the powder were added to a high-speed stirring mixer equipped with a rotating blade. The mixture was stirred at 2,000 rpm to elute the residual alkali from the grain boundaries and perform a dispersion treatment, dried at 350° C., and then dry-sieved to obtain a powder.

Figure 9:
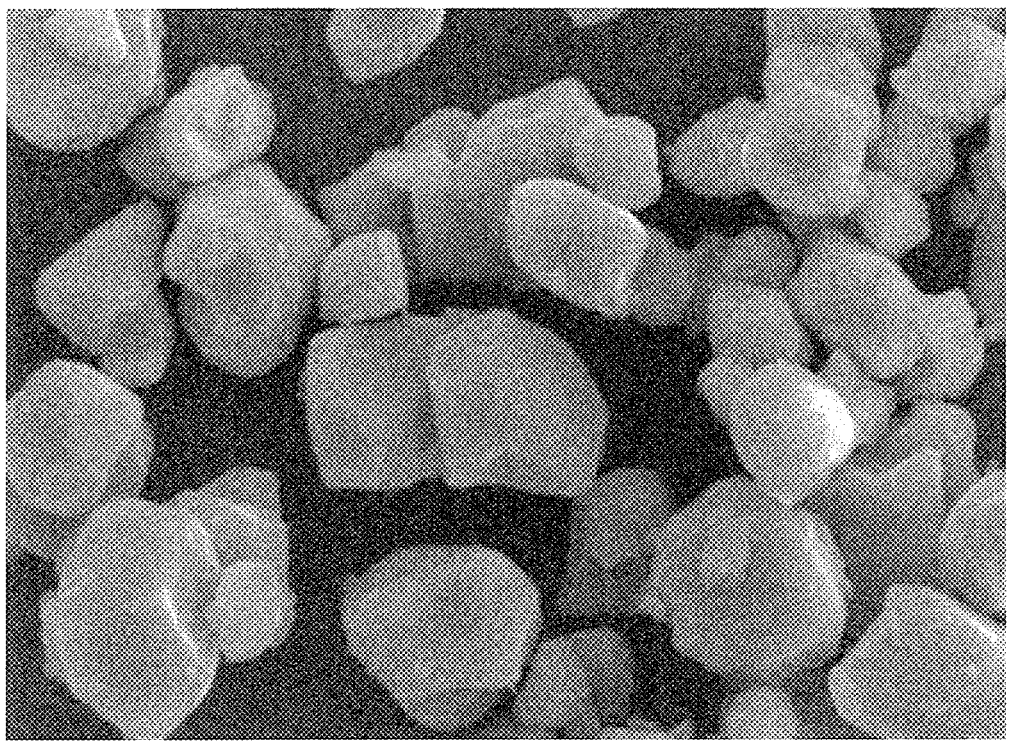
FIG. 9 shows an example of an SEM image of lithium-transition metal composite oxide particles in Example 8.

As a result, lithium-transition metal composite oxide particles represented by the composition formula: $Li_{1.17}Ni_{0.60}Co_{0.20}Mn_{0.20}O_2$ and having the following properties were obtained: average particle size $D_{SEM}$: 3.2 µm, $D_{10}$=3.6 µm, $D_{50}$=6.1 µm, $D_{90}$=9.2 µm, ratio $D_{50}/D_{SEM}$ of $D_{50}$ to average particle size $D_{SEM}$: 1.9, ratio $D_{90}/D_{10}$ in particle size distribution: 2.6, amount of Ni disorder: 1.2%. The physical property values of the obtained lithium-transition metal composite oxide particles are shown in Table 1, and an SEM image thereof is shown in FIG. 9.

Example 9

A composite oxide was obtained under the same conditions as in Example 7. The obtained composite oxide and lithium carbonate were mixed so that Li/(Ni+Co+Mn) becomes 1.17 to obtain a raw material mixture. The obtained raw material mixture was calcined in air at 930° C. for 10 hours to obtain a sintered body. The obtained sintered body was crushed and subjected to a dispersion treatment in a ball mill made of resin for 10 minutes to obtain a powder. Further, the powder and 10 mass % of water with respect to the powder were added to a high-speed stirring mixer equipped with a rotating blade. The mixture was stirred at 2,000 rpm to elute the residual alkali from the grain boundaries and perform a dispersion treatment, dried at 350° C., and then dry-sieved to obtain powder.

As a result, lithium-transition metal composite oxide particles represented by the composition formula: $Li_{1.17}Ni_{0.60}Co_{0.20}Mn_{0.20}O_2$ and having the following properties were obtained: average particle size $D_{SEM}$: 3.1 µm, $D_{10}$=3.8 µm, $D_{50}$=6.3 µm, $D_{90}$=9.6 µm, ratio $D_{50}/D_{SEM}$ of $D_{50}$ to average particle size $D_{SEM}$: 2.0, ratio $D_{90}/D_{10}$ in particle size distribution: 2.5, amount of Ni disorder: 2.2%. The physical property values of the obtained lithium-transition metal composite oxide particles are shown in Table 1.

Comparative Example 3

A composite oxide was obtained under the same conditions as in Example 7. The obtained composite oxide and lithium hydroxide monohydrate were mixed so that Li/(Ni+Co+Mn) becomes 1.17 to obtain a raw material mixture. The obtained raw material mixture was calcined in air at 810° C. for 10 hours to obtain a sintered body. The obtained sintered body was crushed, subjected to a dispersion treatment in a ball mill made of resin for 10 minutes, and then dry-sieved to obtain a powder.

Figure 10:
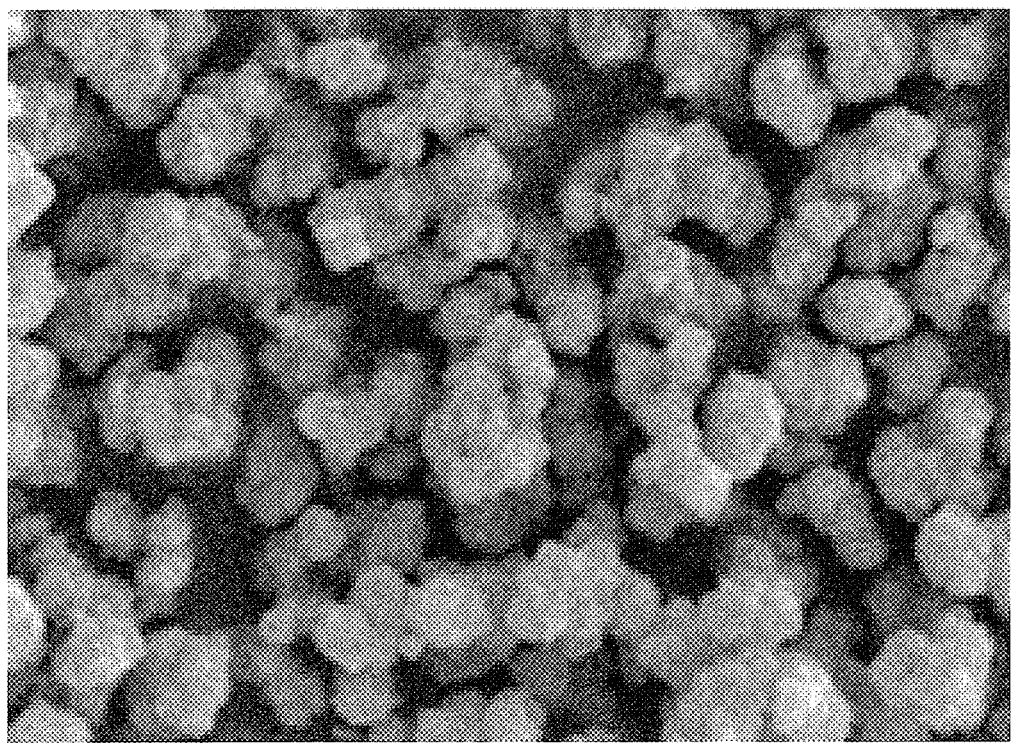
FIG. 10 shows an example of an SEM image of lithium-transition metal composite oxide particles in Comparative Example 3.

As a result, lithium-transition metal composite oxide particles represented by the composition formula: $Li_{1.17}Ni_{0.60}Co_{0.20}Mn_{0.20}O_2$ and having the following properties were obtained: average particle size $D_{SEM}$: 0.4 µm, $D_{10}$=3.2 µm, $D_{50}$=4.7 µm, $D_{90}$=7.5 µm, ratio $D_{50}/D_{SEM}$ of $D_{50}$ to average particle size $D_{SEM}$ of primary particles: 11.8, ratio $D_{90}/D_{10}$ in particle size distribution: 2.3, amount of Ni disorder: 1.0%. The physical property values of the obtained lithium-transition metal composite oxide particles are shown in Table 1, and an SEM image thereof is shown in FIG. 10.

Comparative Example 4

A composite oxide was obtained under the same conditions as in Example 7. The obtained composite oxide and lithium hydroxide monohydrate were mixed so that Li/(Ni+Co+Mn) becomes 1.17 to obtain a raw material mixture. The obtained raw material mixture was calcined in air at 930° C. for 10 hours to give a sintered body. The obtained sintered body was crushed, subjected to a dispersion treatment in a ball mill made of resin for 10 minutes, and then dry-sieved to obtain a powder.

Figure 11:
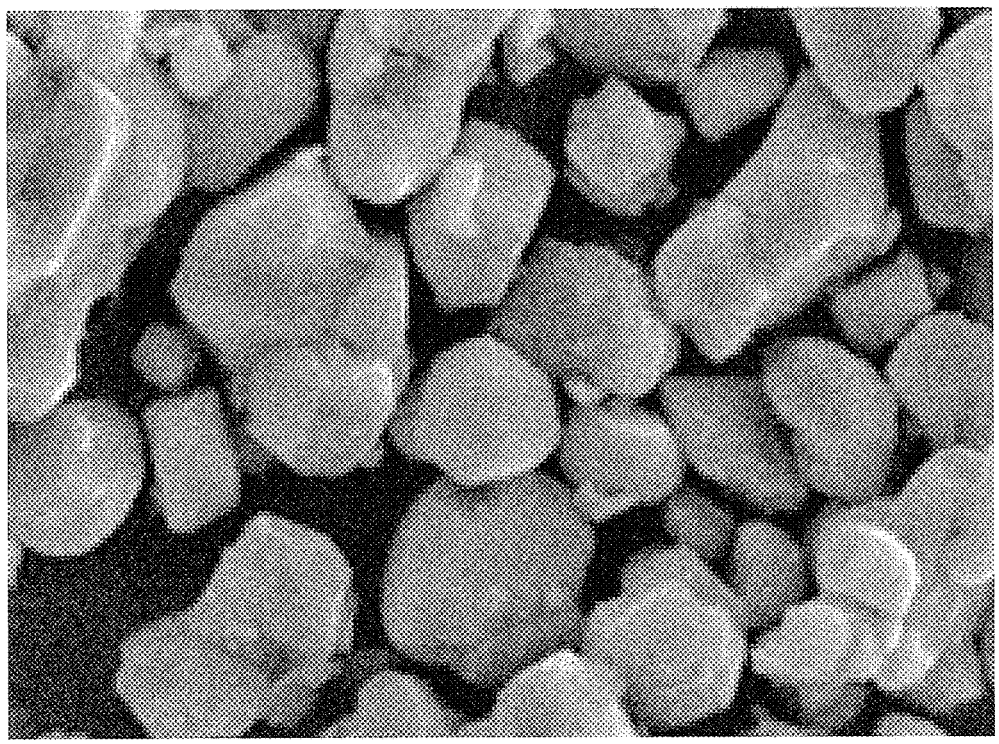
FIG. 11 shows an example of an SEM image of lithium-transition metal composite oxide particles in Comparative Example 4.

As a result, lithium-transition metal composite oxide particles represented by the composition formula: $Li_{1.17}Ni_{0.60}Co_{0.20}Mn_{0.20}O_2$ and having the following properties were obtained: average particle size $D_{SEM}$: 3.2 µm, $D_{10}$=4.1 µm, $D_{50}$=9.6 µm, $D_{90}$=23.4 µm, ratio $D_{50}/D_{SEM}$ of $D_{50}$ to average particle size $D_{SEM}$: 3.0, ratio $D_{90}/D_{10}$ in particle size distribution: 5.7, amount of Ni disorder: 1.3%. The physical property values of the obtained lithium-transition metal composite oxide particles are shown in Table 1, and an SEM image thereof is shown in FIG. 11.

Example 10

Under the same conditions as in Example 1, except that the mixing ratio of a nickel sulfate solution, a cobalt sulfate solution, and a manganese sulfate solution was changed to a molar ratio of 8:1:1 to obtain a mixed aqueous solution, and that the timing of the completion of addition of the mixed aqueous solution in the crystallization step was changed to the time at which the $D_{50}$ of composite hydroxide particles reached 4.7 µm, a composite oxide having the following properties was obtained: composition ratio Ni/Co/Mn=0.80/0.10/0.10, $D_{10}$=3.4 µm, $D_{50}$=4.6 µm, $D_{90}$=6.1 µm, $D_{90}/D_{10}$=1.8. The obtained composite oxide and lithium hydroxide monohydrate were mixed so that Li/(Ni+Co+Mn) becomes 1.04 to obtain a raw material mixture. The obtained raw material mixture was calcined in an oxygen stream at 780° C. for 5 hours, then calcined at 1,000° C. for 10 hours, and further calcined at 780° C. for 5 hours to obtain a sintered body. The obtained sintered body was crushed and subjected to a dispersion treatment in a ball mill made of resin for 10 minutes to obtain a powder. Further, the powder and 10 mass % of water with respect to the powder were added to a high-speed stirring mixer equipped with a rotating blade. The mixture was stirred at 2,000 rpm to elute the residual alkali from the grain boundaries and perform a dispersion treatment, dried at 350° C., and then dry-sieved to obtain a powder.

Figure 12:
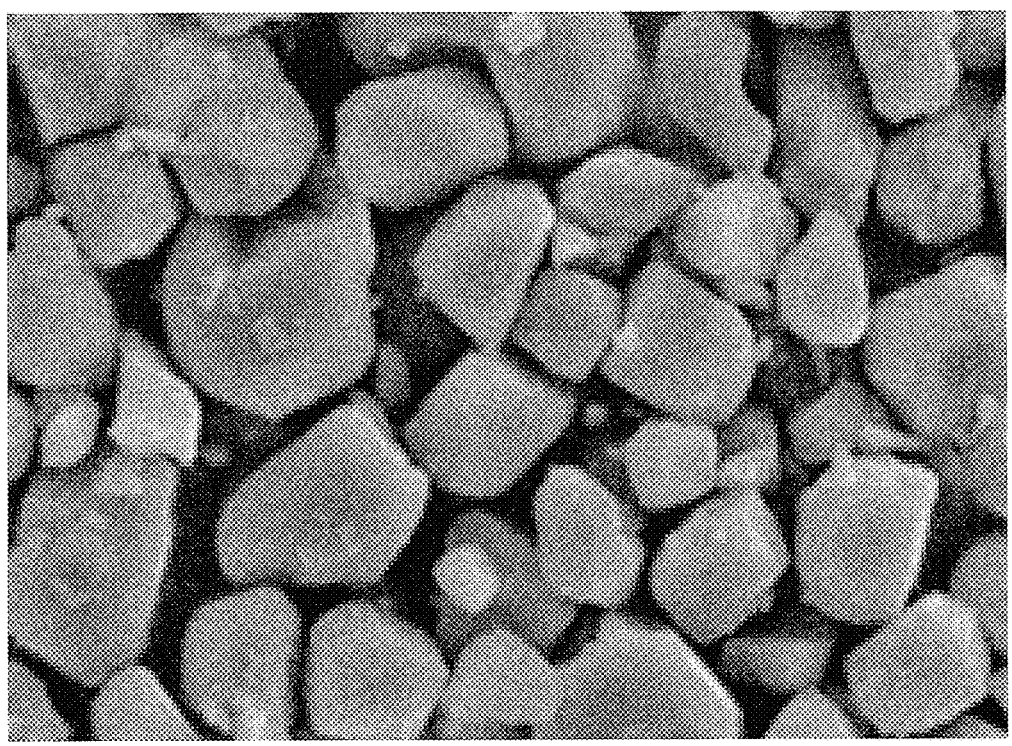
FIG. 12 shows an example of an SEM image of lithium-transition metal composite oxide particles in Example 10.

As a result, lithium-transition metal composite oxide particles represented by the composition formula: $Li_{1.04}Ni_{0.80}Co_{0.10}Mn_{0.10}O_2$ and having the following properties were obtained: average particle size $D_{SEM}$: 3.1 µm, $D_{10}$=3.7 µm, $D_{50}$=7.1 µm, $D_{90}$=12.0 µm, ratio $D_{50}/D_{SEM}$ of $D_{50}$ to average particle size $D_{SEM}$: 2.3, ratio $D_{90}/D_{10}$ in particle size distribution: 3.2, amount of Ni disorder: 1.7%. The physical property values of the obtained lithium-transition metal composite oxide particles are shown in Table 1, and an SEM image thereof is shown in FIG. 12.

Example 11

A composite oxide was obtained under the same conditions as in Example 10. The obtained composite oxide and lithium hydroxide monohydrate were mixed so that Li/(Ni+Co+Mn) becomes 1.04 to obtain a raw material mixture. The obtained raw material mixture was calcined in an oxygen stream at 780° C. for 5 hours and then calcined at 950° C. for 10 hours to obtain a sintered body. The obtained sintered body was crushed and subjected to a dispersion treatment in a ball mill made of resin for 10 minutes to obtain a powder. Further, the powder and 10 mass % of water with respect to the powder were added to a high-speed stirring mixer equipped with a rotating blade. The mixture was stirred at 2,000 rpm to elute the residual alkali from the grain boundaries and perform a dispersion treatment, dried at 350° C., and then dry-sieved to obtain a powder.

Figure 13:
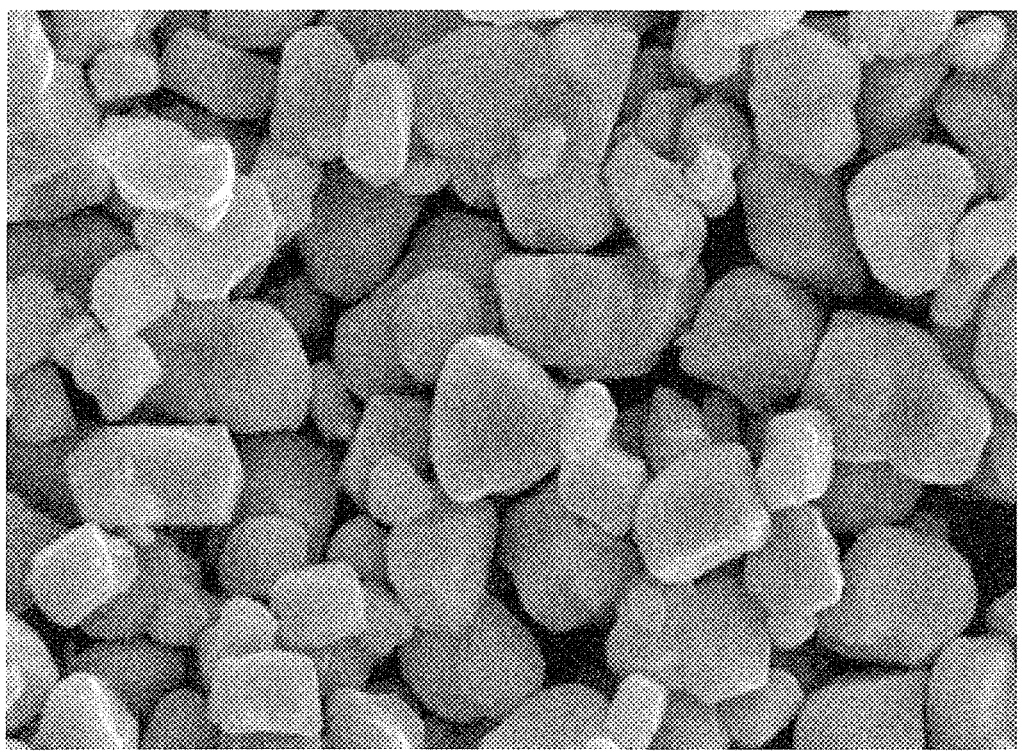
FIG. 13 shows an example of an SEM image of lithium-transition metal composite oxide particles in Example 11.

As a result, lithium-transition metal composite oxide particles represented by the composition formula: $Li_{1.04}Ni_{0.80}Co_{0.10}Mn_{0.10}O_2$ and having the following properties were obtained: average particle size $D_{SEM}$: 2.5 µm, $D_{10}$=3.0 µm, $D_{50}$=5.3 µm, $D_{90}$=8.2 µm, ratio $D_{50}/D_{SEM}$ of $D_{50}$ to average particle size $D_{SEM}$: 2.1, ratio $D_{90}/D_{10}$ in particle size distribution: 2.7, amount of Ni disorder: 2.3%. The physical property values of the obtained lithium-transition metal composite oxide particles are shown in Table 1, and an SEM image thereof is shown in FIG. 13.

Example 12

A composite oxide was obtained under the same conditions as in Example 10. The obtained composite oxide and lithium hydroxide monohydrate were mixed so that Li/(Ni+Co+Mn) becomes 1.04 to obtain a raw material mixture. The obtained raw material mixture was calcined in an oxygen stream at 780° C. for 5 hours and then calcined at 1,000° C. for 10 hours to give a sintered body. The obtained sintered body was crushed and subjected to a dispersion treatment in a ball mill made of resin for 10 minutes to obtain a powder. Further, the powder and 10 mass % of water with respect to the powder were added to a high-speed stirring mixer equipped with a rotating blade. The mixture was stirred at 2,000 rpm to elute the residual alkali from the grain boundaries and perform a dispersion treatment, dried at 350° C., and then dry-sieved to obtain a powder.

Figure 14:
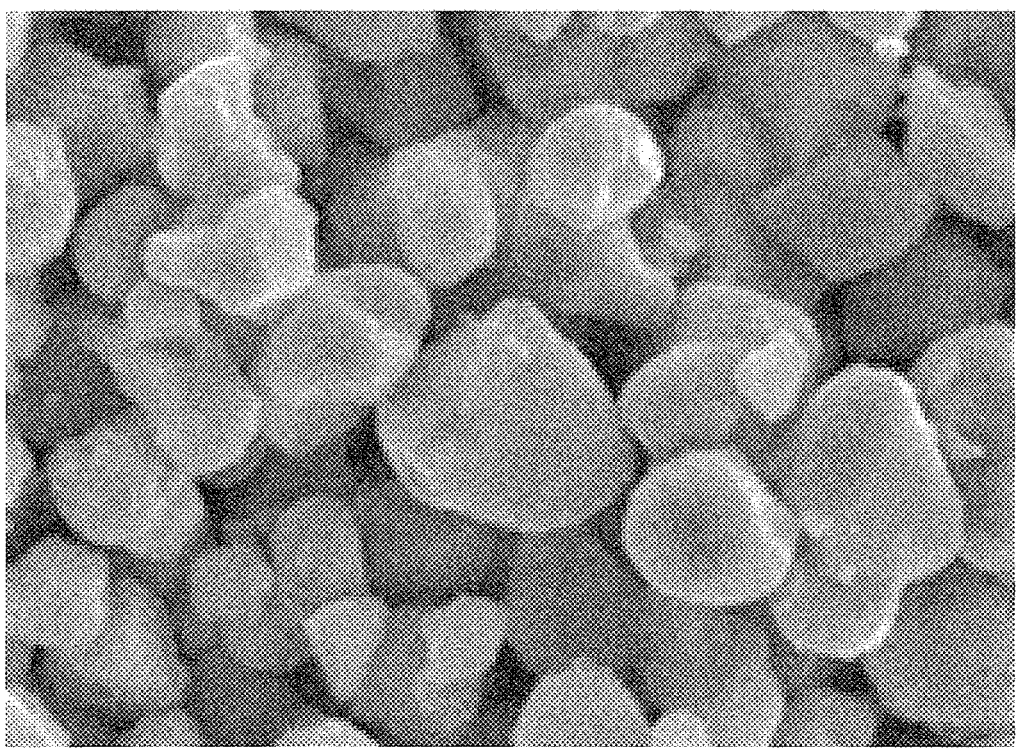
FIG. 14 shows an example of an SEM image of lithium-transition metal composite oxide particles in Example 12.

As a result, lithium-transition metal composite oxide particles represented by the composition formula: $Li_{1.04}Ni_{0.80}Co_{0.10}Mn_{0.10}O_2$ and having the following properties were obtained: average particle size $D_{SEM}$: 3.0 µm, $D_{10}$=3.7 µm, $D_{50}$=6.6 µm, $D_{90}$=9.6 µm, ratio $D_{50}/D_{SEM}$ of $D_{50}$ to average particle size $D_{SEM}$: 2.2, ratio $D_{90}/D_{10}$ in particle size distribution: 2.6, amount of Ni disorder: 4.2%. The physical property values of the obtained lithium-transition metal composite oxide particles are shown in Table 1, and an SEM image thereof is shown in FIG. 14.

Comparative Example 5

Under the same conditions as in Example 1, except that the mixed aqueous solution was changed to a mixture of a nickel sulfate solution and a cobalt sulfate solution mixed at molar ratio of 80:15, and that the timing of the completion of addition of the mixed solution in the crystallization step was changed to the time at which the $D_{50}$ of composite hydroxide particles reached 4.6 µm, a composite oxide having the following properties was obtained: composition ratio Ni/Co=0.80/0.15, $D_{10}$=3.4 µm, $D_{50}$=4.6 µm, $D_{90}$=6.1 µm, $D_{90}/D_{10}$=1.8. The obtained composite oxide and aluminum oxide were mixed so that composition ratio of Ni/Co/Al becomes 0.80/0.15/0.05, and lithium hydroxide monohydrate was mixed so that Li/(Ni+Co+Al) becomes 1.04, so that a raw material mixture is obtained. The obtained raw material mixture was calcined in air at 710° C. for 5 hours to obtain a sintered body. The obtained sintered body was crushed, subjected to a dispersion treatment in a ball mill made of resin for 10 minutes, and then dry-sieved to obtain a powder.

Figure 15:
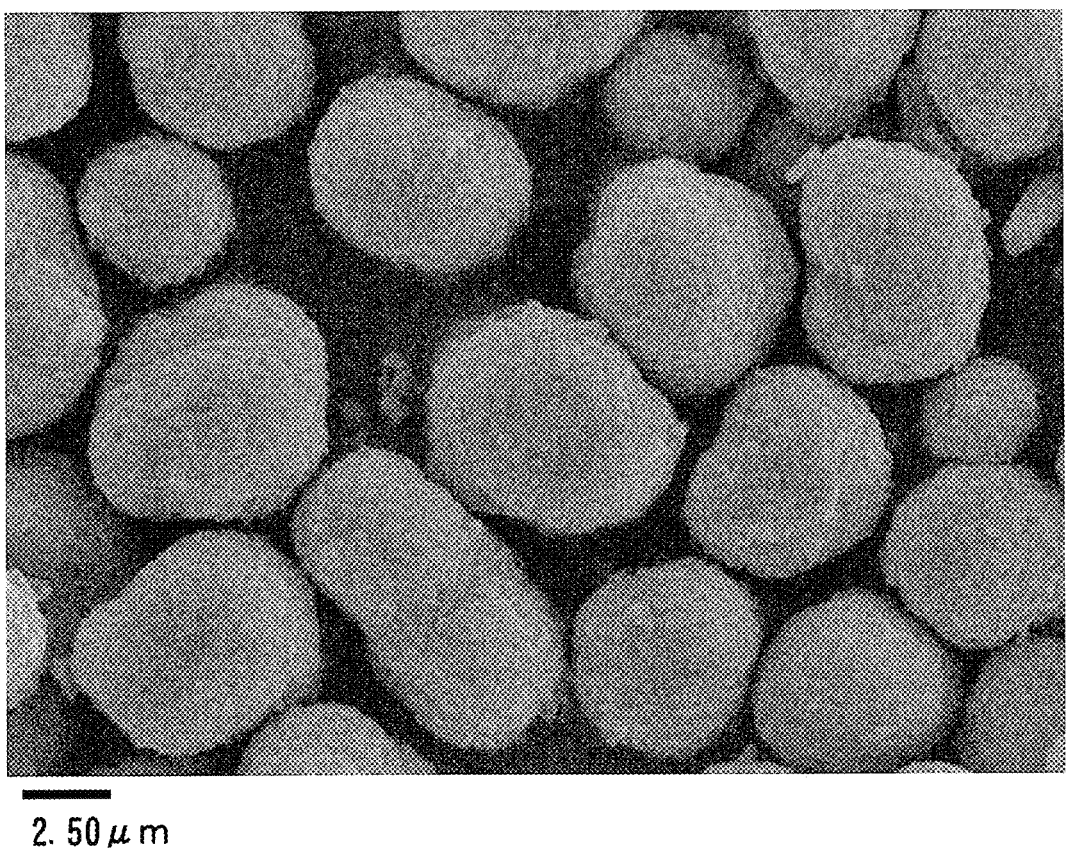
FIG. 15 shows an example of an SEM image of lithium-transition metal composite oxide particles in Comparative Example 5.

As a result, lithium-transition metal composite oxide particles represented by the composition formula: $Li_{1.04}Ni_{0.80}Co_{0.15}MnAl_{0.05}O_2$ and having the following properties were obtained: average particle size $D_{SEM}$: 0.3 µm, $D_{10}$=4.5 µm, $D_{50}$=5.8 µm, $D_{90}$=7.4 µm, ratio $D_{50}/D_{SEM}$ of $D_{50}$ to average particle size $D_{SEM}$: 19.3, ratio $D_{90}/D_{10}$ in particle size distribution: 1.6, amount of Ni disorder: 1.0%. The physical property values of the obtained lithium-transition metal composite oxide particles are shown in Table 1, and an SEM image thereof is shown in FIG. 15.

Evaluation

Using the lithium-transition metal composite oxides obtained above as positive electrode active materials, batteries for evaluation were produced as below.

Production of Positive Electrode

Ninety six parts by mass of a positive electrode active material, 3 parts by mass of acetylene black, and 1 part by mass of polyvinylidene fluoride (PVDF) were dispersed in N-methyl-2-pyrrolidone (NMP) to prepare a positive electrode mixture. The obtained positive electrode mixture was applied to an aluminum foil that serves as a current collector, dried, then compression-molded using a roll press, and cut into a predetermined size, so that a positive electrode was produced.

Production of Negative Electrode

Ninety six parts by mass of a negative electrode active material and 4 parts by mass of PVDF were dispersed in NMP to prepare a negative electrode mixture. The obtained negative electrode mixture was applied to a copper foil as a current collector, dried, then compression-molded using a roll press, and cut into a predetermined size, so that a negative electrode was produced.

Production of Battery for Evaluation

Lead electrodes were attached to the positive electrode current collector and the negative electrode current collector, respectively, then a separator was placed between the positive electrode and the negative electrode, and they were housed in a bag-shaped laminate pack. Next, the laminate pack was vacuum-dried at 65° C. to remove the moisture adsorbed on each member. Subsequently, in an argon atmosphere, an electrolyte solution was injected into the laminate pack and sealed. The battery thus obtained was placed in a thermostat at 25° C. and aged under a weak current. For the electrolyte solution, a solution prepared by mixing ethylene carbonate (EC) and methylethyl carbonate (MEC) at a volume ratio of 3:7, and then dissolving lithium hexafluorophosphate ($LiPF_6$) to a concentration of 1 mol/l, was used.

Charge/Discharge Test

With respect to the batteries for evaluation obtained above, the power density and durability were evaluated as below.

Power Density

A battery for evaluation was discharged to 50% SOC and maintained under an environment at 25° C. for 2 hours. Subsequently, from the state where the SOC is 50%, the battery was discharged at a constant current, the DC resistance after 10 seconds was measured, and the power density was calculated. The minimum discharge voltage was set at 2.7 V.

Durability

A charge/discharge cycle test was performed under a temperature condition of 60° C. In the charge/discharge cycle test, as one cycle, a battery was charged at a constant current having a current density of 2.0 mA/cm² to the maximum charge voltage of 4.2 V and then discharged at a constant current having a current density of 2.0 mA/cm² to the minimum discharge voltage of 2.7 V. This cycle was repeated 1,000 times in total. Then, the discharge capacity was measured in each cycle, and durability (%) was calculated using the following formula: (discharge capacity in the 1,000th cycle/discharge capacity in the first cycle)×100. The evaluation results are shown in Table 1.

TABLE 1

| | Composition | | | | $D_{SEM}$ | $D_{10}$ | $D_{50}$ | $D_{90}$ | | | amount of Ni | Power Density | Durability |
|---|---|---|---|---|---|---|---|---|---|---|---|---|---|
| | p | x | y | z | (μm) | (μm) | (μm) | (μm) | $D_{50}/D_{SEM}$ | $D_{90}/D_{10}$ | Disorder (%) | (W/kg) | (%) |
| Example 1 | 1.15 | 0.33 | 0.33 | 0.33 | 3.6 | 3.7 | 5.1 | 6.7 | 1.4 | 1.8 | 0.3 | 9560 | 86 |
| Example 2 | 1.17 | 0.33 | 0.33 | 0.33 | 1.2 | 1.4 | 3.2 | 5.1 | 2.7 | 3.6 | 1.7 | 7800 | 86 |
| Example 3 | 1.17 | 0.33 | 0.33 | 0.33 | 1.2 | 1.5 | 3.3 | 5.1 | 2.8 | 3.4 | 0.9 | 8090 | 85 |
| Example 4 | 1.17 | 0.33 | 0.33 | 0.33 | 1.4 | 1.1 | 1.9 | 2.8 | 1.4 | 2.5 | 1.0 | 10220 | 86 |
| Example 5 | 1.14 | 0.33 | 0.33 | 0.33 | 6.8 | 7.6 | 10.4 | 16.4 | 1.5 | 2.2 | 1.1 | 9180 | 86 |
| Example 6 | 1.14 | 0.33 | 0.33 | 0.33 | 1.25 | 2.7 | 4.5 | 6.7 | 3.6 | 2.5 | 1.0 | 6810 | 76 |
| Comparative Example 1 | 1.14 | 0.33 | 0.33 | 0.33 | 3.65 | 2.5 | 7 | 13.5 | 1.9 | 5.4 | 0.9 | 6200 | 76 |
| Comparative Example 2 | 1.15 | 0.33 | 0.33 | 0.33 | 0.49 | 3 | 4.4 | 7.6 | 9.0 | 2.5 | 0.9 | 5950 | 76 |
| Example 7 | 1.06 | 0.6 | 0.2 | 0.2 | 3.7 | 3.4 | 5.4 | 7.7 | 1.5 | 2.3 | 1.5 | 10500 | 84 |
| Example 8 | 1.17 | 0.6 | 0.2 | 0.2 | 3.2 | 3.6 | 6.1 | 9.2 | 1.9 | 2.6 | 1.2 | 9800 | 85 |
| Example 9 | 1.17 | 0.6 | 0.2 | 0.2 | 3.1 | 3.8 | 6.3 | 9.6 | 2.0 | 2.5 | 2.2 | 9150 | 84 |
| Comparative Example 3 | 1.17 | 0.6 | 0.2 | 0.2 | 0.4 | 3.2 | 4.7 | 7.5 | 11.8 | 2.3 | 1.0 | 6400 | 73 |
| Comparative Example 4 | 1.17 | 0.6 | 0.2 | 0.2 | 3.2 | 4.1 | 9.6 | 23.4 | 3.0 | 5.7 | 1.3 | 6660 | 72 |
| Example 10 | 1.04 | 0.8 | 0.1 | 0.1 | 3.1 | 3.7 | 7.1 | 12.0 | 2.3 | 3.2 | 1.7 | 11000 | 84 |
| Example 11 | 1.04 | 0.8 | 0.1 | 0.1 | 2.5 | 3 | 5.3 | 8.2 | 2.1 | 2.7 | 2.3 | 11700 | 83 |
| Example 12 | 1.04 | 0.8 | 0.1 | 0.1 | 3.0 | 3.7 | 6.6 | 9.6 | 2.2 | 2.6 | 4.2 | 10600 | 83 |
| Comparative Example 5 | 1.04 | 0.8 | 0.15 | — | 0.30 | 4.5 | 5.8 | 7.4 | 19.3 | 1.6 | 1 | 7100 | 70 |

As shown in Table 1, the positive electrode active materials in Examples 1 to 12 exhibit good power density and durability as compared with Comparative Examples 1 to 5. Among them, in the case where x satisfies 0.3≤x<0.6, Examples 1, 3, and 5 show improved power density, and Example 4 shows particularly improved power density. In addition, in the case where x satisfies x 0.6≤x<0.8, Example 8 shows good power density, and Example 7 shows particularly good power density. In the case where x satisfies 0.8≤x<0.95, Example 10 shows good power density, and Example 11 shows particularly good power density.

A nonaqueous electrolyte secondary battery including an electrode for a nonaqueous electrolyte secondary battery using the positive electrode active material of the present disclosure has good power density and durability, and thus is suitable for large-sized power machines, such as electric vehicles.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may not be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a nonaqueous electrolyte secondary battery, comprising particles of a lithium-transition metal composite oxide that contains nickel in the composition thereof and has a layered structure, wherein a ratio $D_{50}/D_{SEM}$ of a 50% particle size $D_{50}$ in volume-based cumulative particle size distribution to an average particle size $D_{SEM}$ based on electron microscopic observation is in a range of 1 to 4, wherein the $D_{SEM}$ is to be determined as follows: observing an image at a magnification of 1,000 to 10,000 using a scanning electron microscope (SEM), selecting 100 particles having recognizable outlines, calculating the equivalent spherical diameters of the selected particles using an image processing software, and determining the arithmetic average of the obtained equivalent spherical diameters as $D_{SEM}$; and a ratio $D_{90}/D_{10}$ of a 90% particle size $D_{90}$ to a 10% particle size $D_{10}$ in volume-based cumulative particle size distribution is 4 or less.

2. The positive electrode active material according to claim 1, wherein the $D_{SEM}$ is 7 or less.

3. The positive electrode active material according to claim 1, wherein the $D_{SEM}$ is 3 or less.

4. The positive electrode active material according to claim 1, wherein the ratio $D_{50}/D_{SEM}$ of the $D_{50}$ to the $D_{SEM}$ is 1 to 3.

5. The positive electrode active material according to claim 1, wherein the lithium-transition metal composite oxide has a composition represented by the following formula (1):

$$Li_pNi_xCo_yM^1_zO_{2+\alpha} \qquad (1),$$

wherein p, x, y, z, and α satisfy $1.0 \le p \le 1.3$, $0.3 \le x \le 0.95$, $0 \le y \le 0.4$, $0 \le z \le 0.5$, $x+y+z=1$, and $-0.1 \le \alpha \le 0.1$, and $M^1$ represents at least one of Mn and Al.

6. The positive electrode active material according to claim 5, wherein $0.3 \le x < 0.8$, and the ratio $D_{50}/D_{SEM}$ of the $D_{50}$ to the $D_{SEM}$ is in a range of 1 to 2.

7. The positive electrode active material according to claim 5, wherein $0.3 \le x < 0.6$, and a disorder of nickel element in the lithium-transition metal composite oxide particles determined by X-ray diffractometry is 1.5% or less.

8. The positive electrode active material according to claim 5, wherein $0.3 \le x < 0.6$, and the ratio $D_{90}/D_{10}$ of the $D_{90}$ to the $D_{10}$ is 3 or less.

9. The positive electrode active material according to claim 5, wherein $0.3 \le x < 0.6$, and the ratio $D_{90}/D_{10}$ of the $D_{90}$ to the $D_{10}$ is 2.5 or less.

10. The positive electrode active material according to claim 5, wherein $0.3 \le x < 0.6$, and the $D_{50}$ is in a range of 1 μm to 5.5 μm.

11. The positive electrode active material according to claim 5, wherein $0.3 \le x < 0.6$, and the $D_{50}$ is in a range of 1 μm to 3 μm.

12. The positive electrode active material according to claim 5, wherein, when $0.3 \le x < 0.6$, $1.1 < p < 1.2$.

13. The positive electrode active material according to claim 5, wherein $0.6 \le x < 0.8$, and the disorder of elemental nickel in the lithium-transition metal composite oxide particles determined by X-ray diffractometry is 2.0% or less.

14. The positive electrode active material according to claim 5, wherein $0.6 \le x < 0.8$, and the ratio $D_{90}/D_{10}$ of the $D_{90}$ to the $D_{10}$ is 2.3 or less.

15. The positive electrode active material according to claim 5, wherein $0.6 \le x < 0.8$, and the $D_{50}$ is in a range of 1 μm to 5.5 μm.

16. The positive electrode active material according to claim 5, wherein $0.8 \le x \le 0.95$, and the disorder of elemental nickel determined by X-ray diffractometry is 4.0% or less.

17. The positive electrode active material according to claim 5, wherein $0.8 \le x \le 0.95$, and the ratio $D_{90}/D_{10}$ of the $D_{90}$ to the $D_{10}$ is 3 or less.

18. The positive electrode active material according to claim 5, wherein $0.8 \le x \le 0.95$, and the $D_{50}$ is in a range of 1 μm to 5.5 μm.

19. An electrode for a nonaqueous electrolyte secondary battery, comprising:
a current collector; and
a positive electrode active material layer that is disposed on the current collector and contains the positive electrode active material according to claim 1.

20. A nonaqueous electrolyte secondary battery comprising the electrode according to claim 19.

* * * * *